United States Patent
Pranger et al.

(10) Patent No.: US 11,017,239 B2
(45) Date of Patent: May 25, 2021

(54) EMOTIVE RECOGNITION AND FEEDBACK SYSTEM

(71) Applicant: POSITIVE IQ, LLC, Sandy, UT (US)

(72) Inventors: Eugene Patrick Pranger, Alpine, UT (US); Jed W. Taylor, Eagle Mountain, UT (US); Timothy Eugene Pranger, South Jordan, UT (US); Catharine Sparks, Preston, ID (US)

(73) Assignee: POSITIVE IQ, LLC, Sandy, UT (US)

(*) Notice: Subject to any disclaimer, the term of this patent is extended or adjusted under 35 U.S.C. 154(b) by 60 days.

(21) Appl. No.: 16/273,972

(22) Filed: Feb. 12, 2019

(65) Prior Publication Data

US 2019/0251359 A1    Aug. 15, 2019

Related U.S. Application Data

(60) Provisional application No. 62/629,670, filed on Feb. 12, 2018.

(51) Int. Cl.
*G06K 9/00* (2006.01)
*G06F 16/783* (2019.01)

(52) U.S. Cl.
CPC ....... *G06K 9/00744* (2013.01); *G06F 16/784* (2019.01); *G06K 9/00302* (2013.01)

(58) Field of Classification Search
CPC .......................... G06K 9/00744; G06F 16/784

USPC ......................................................... 382/103
See application file for complete search history.

(56) References Cited

U.S. PATENT DOCUMENTS

| | | | | |
|---|---|---|---|---|
| 2013/0106980 | A1* | 5/2013 | Obaidi | H04L 65/1069 348/14.02 |
| 2016/0182435 | A1* | 6/2016 | Landqvist | G06Q 10/10 709/204 |
| 2017/0220677 | A1* | 8/2017 | Kazi | G06F 16/3344 |
| 2017/0358035 | A1* | 12/2017 | Benfield | G06F 16/41 |
| 2018/0277145 | A1* | 9/2018 | Yamaya | G10L 15/063 |

* cited by examiner

*Primary Examiner* — Stephen P Coleman
(74) *Attorney, Agent, or Firm* — Keller Jolley Preece

(57) ABSTRACT

This disclosure relates to an emotive recognition and feedback system that identifies emotive states of users within a video chat session and determines communication recommendations based on the interaction of the participants' emotive states. For instance, the emotive recognition and feedback system analyzes a video data to determine the participants' individual emotive states. Based on mapping the participants' individual emotive states, the emotive recognition and feedback system can determine a communication recommendation for the video chat. Additionally, the emotive response system provides graphical user interfaces that presents the communication recommendation to the video chat participants. The emotive recognition and feedback system can perform real-time analysis and feedback or delayed analytics of previously performed video chats.

20 Claims, 13 Drawing Sheets

|   | | 6 | 5 | 4 | 3 | 2 | 1 | 0 |
|---|---|---|---|---|---|---|---|---|
| | First User → | Joy | Surprise | Neutral | Sadness | Disgust | Anger | Fear |
| 6 | Joy | 6 | 5 | 4 | 3 | 2 | 1 | 0 |
| 5 | Surprise | 5 | 4 | 3 | 2 | 1 | 0 | -1 |
| 4 | Neutral | 4 | 3 | 2 | 1 | 0 | -1 | -2 |
| 3 | Sadness | 3 | 2 | 1 | 0 | -1 | -2 | -3 |
| 2 | Disgust | 2 | 1 | 0 | -1 | -2 | -3 | -4 |
| 1 | Anger | 1 | 0 | -1 | -2 | -3 | -4 | -5 |
| 0 | Fear | 0 | -1 | -2 | -3 | -4 | -5 | -6 |

↑ Second User 422

420 — First User

*Fig. 4C*

EMOTIVE RECOGNITION AND FEEDBACK SYSTEM

CROSS REFERENCE TO RELATED APPLICATIONS

This application claims the benefit of priority to U.S. Provisional Patent Application No. 62/629,670, filed Feb. 12, 2018, and titled EMOTIVE RECOGNITION AND FEEDBACK SYSTEM, which is incorporated herein by reference in its entirety.

BACKGROUND

Recent years have seen significant improvements in hardware and software platforms for facilitating communication. In particular, many conventional types of communication, for example in financial (banks, credit unions, etc.), academic research, healthcare, and personal contexts, are finding that email, contact forms, and even phone calls are becoming outdated and stale compared to preferred mobile device-based communication methods. For example, mobile device-based methods used by social systems are often very easy to use with low barriers to interaction and communication. Mobile device-based communication methods used by social systems can include video conferencing technology. Thus, for instance, many industries often utilize customer service communication systems that utilize video conferencing technology to execute customer service functions. In particular, customer service representatives can use conventional customer service communication systems to offer more personal face-to-face interaction with customers.

Although conventional customer service communication systems can allow more personal interactions between customer service representatives and customers, conventional customer service communication systems have a number of shortcomings. For instance, because a mobile application may generally substitute for face-to-face interaction, a customer may have little interaction with any people associated with the business, leading to disconnect between the customer and the business. This disconnect can weaken the business-customer relationship. Furthermore, even when such mobile applications provide face-to-face interactions, such as via a video chat, customers or members can often feel that this "newer" technology is cold and prevents representatives from comprehending their intentions and emotional state. Attempts by conventional customer service communication systems to remedy this shortcoming often result in additional shortcomings. Specifically, conventional customer service communication systems are often inaccurate, function inefficiently, and are inefficient to use.

Conventional customer service communication systems are often inaccurate. In particular, conventional customer service communication systems are often unable to accurately identify ways to improve a conversation between a customer service representative and a customer. For example, during a customer service video conference, individual customer service representatives are most often responsible for monitoring the quality of the call and the emotional state of the customer based on visual, audio, and other cues. While some conventional systems seek to remedy this deficiency by utilizing audio visual monitoring technology to monitor the emotional states of the customer, conventional systems often do not collect enough data to monitor the communication session as a whole. In other words, conventional customer service communication systems are often inaccurate in evaluating the quality of a conference call.

Additionally, conventional customer service communication systems often function inefficiently. In particular, conventional customer service communication systems that monitor conference calls regularly process entire video and audio feeds of the conference calls. Processing the entire video and audio feeds is costly of computational resources. For example, in conventional customer service communication systems, the individual user devices can be required to perform video and audio processing. In such cases, the individual user device's computational capacity can be strained by analyzing the media streams.

Furthermore, conventional customer service communication systems often provide cumbersome user interfaces that require users to drill down through many layers to access desired data. In particular, in order to access video data and recommendations for multiple users over time, a customer service representative would be required to identify individual calls and separately view information for each of the calls. Conventional systems also often face technical deficiencies that prevent users from efficiently accessing not only real-time information that assesses an instant moment in a conferencing session but also information that benefits customers by providing information from the beginning of the session to the end of the session and also information over a number of conferencing sessions. Thus, conventional customer service communication systems face technical difficulties that require users to dill down through many layers to get desired data.

These and other disadvantages exist with respect to conventional customer service communication systems.

SUMMARY

One or more implementations of the present invention solve one or more of the foregoing or other problems in the art with systems, computer-readable media, and methods for generating dynamic emotive recognition for interactive video engagements. In particular, one or more embodiments leverage and combine peer-to-peer video communication technology and multimodal emotion recognition technology to provide feedback to support positive communication between chat participants. More specifically, systems, computer-readable media, and methods employ facial and voice emotion recognition technology to analyze subtle facial and vocal expressions to identify and classify human emotions of participants in the video chat. In such embodiments, the systems, computer-readable media, and methods evaluate, in real time, the interaction and effects of distinct emotional cues of the participants to the video chat. The systems, computer-readable media, and methods integrate determined interaction data in a real-time support communication with the video chat to allow for improved communications and interactions. For example, one or more embodiments provide an emotional analysis of a customer or member throughout the duration of a video call, thereby allowing the support agent to see their effectiveness in real time. Furthermore, one or more embodiments provide the support agent advice and recommendations using real-time intelligent analysis and feedback.

The disclosed methods, systems, and computer-readable media help resolve shortcomings of conventional customer service communication systems. For example, the disclosed systems help strengthen the business-customer relationship by providing customer service representatives with real-time recommendations to improve their interactions with the customer. In particular, by collecting data from participants in a video chat, the emotive recognition and feedback system can monitor the video chat as a whole and provide more accurate feedback. Furthermore, the disclosed systems provide graphical user interfaces and otherwise surface information in ways that allows users to efficiently access desired data.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

Various embodiments will be described and explained with additional specificity and detail through the use of the accompanying drawings in which:

FIG. 4C illustrates an example coded emotive interactivity matrix in accordance with one or more implementations of the present invention;

DETAILED DESCRIPTION

Figure 1:
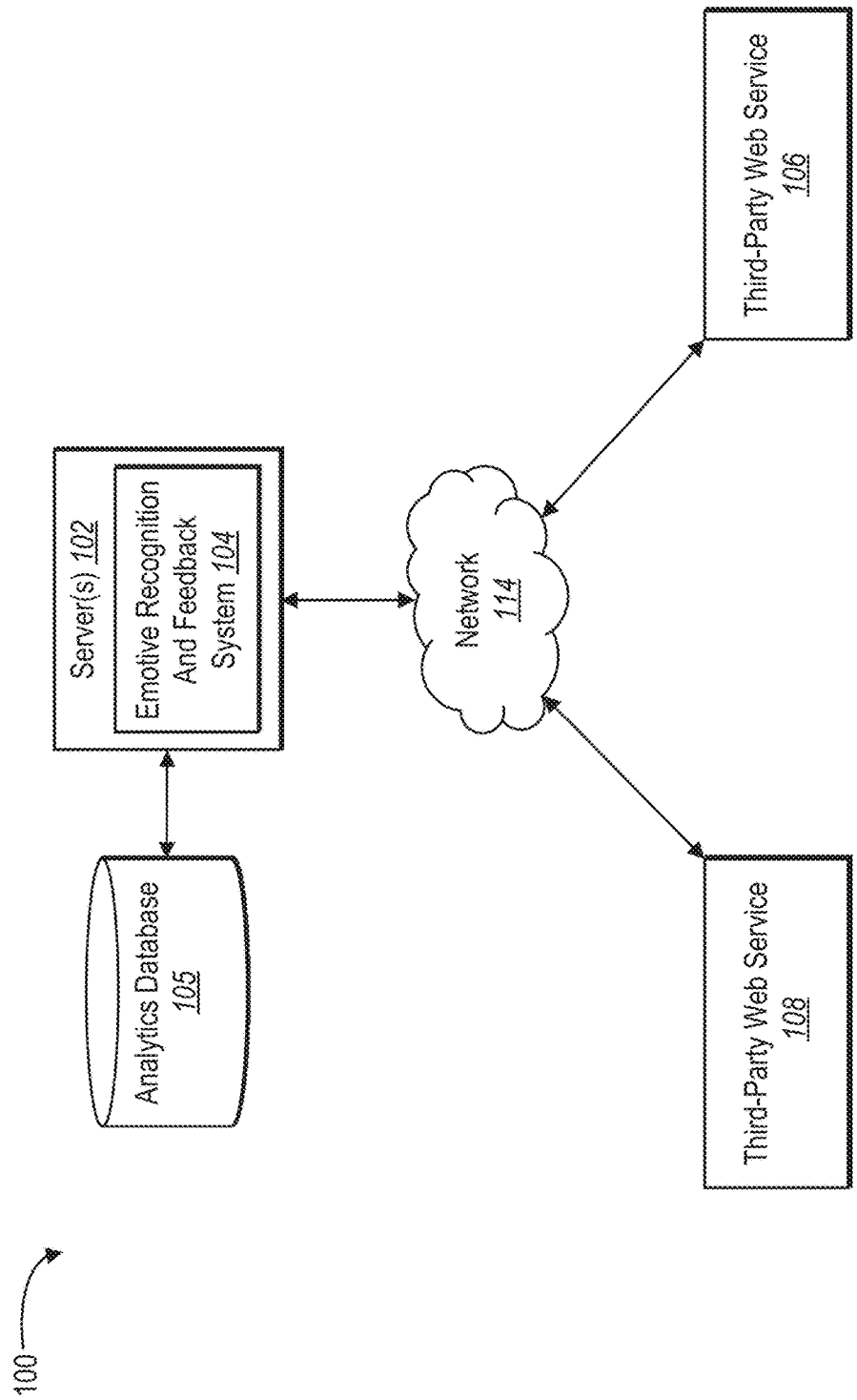
FIG. 1 illustrates an environment in which an emotive recognition and feedback system can operate in accordance with one or more implementations of the present invention.

One or more implementations of the present invention include apparatus and methods simple, unique, and customizable communication and support solutions that increase transparency and enhance the interaction and communication effectiveness using responses and recommendations based on emotive response. In particular, one or more implementations of the present invention include an emotive recognition and feedback system that employs facial and voice emotion recognition technology to analyze subtle facial and vocal expressions to identify and classify human emotions of participants in a video chat. The emotive recognition and feedback system evaluates, in real time, the interaction and effects of distinct emotional cues of the participants to the video chat.

More particularly, in one or more embodiments the emotive recognition and feedback system utilizes emotion artificial intelligence to recognize, interpret, process, and simulate human emotion. For example, the emotive recognition and feedback system can use facial coding technology to measure facial expressions of emotion in real time using algorithms to identify key landmarks on the face and analyzing pixels in those regions to classify facial expressions. The emotive recognition and feedback system can use combinations of these facial expressions to identify and classify emotions. In one or more embodiments, the emotive recognition and feedback system measures seven emotion metrics using facial coding technology: joy, surprise, neutral, sadness, disgust, anger, and fear.

Furthermore, the emotive recognition and feedback system can use vocal coding to analyze not what is said in a video chat, but how it is said. In particular, the emotive recognition and feedback system can observe changes in speech paralinguistics, such as tone, loudness, tempo, and voice quality, to distinguish emotions. In one or more embodiments, the emotive recognition and feedback system measures five emotion metrics using vocal coding: joy, neutral, sadness, anger, and fear.

The emotive recognition and feedback system can integrate the determined interaction data (e.g., emotions determined using vocal coding and/or facial coding technology) in a real-time support communication integrated with the video chat to allow for improved communications and interactions. For example, the emotive recognition and feedback system provides an emotional analysis of a customer or member throughout the duration of a video call, thereby allowing a support representative to see their effectiveness in real time. Furthermore, the emotive recognition and feedback system can provide the support representative advice and recommendations using real-time intelligent analysis and feedback.

The emotive recognition and feedback system delivers highly personalized recommendations through a number of new channels. The emotive recognition and feedback system can integrate behind single sign on servers to transmit communications to an institution or other entity or vice versa. The emotive recognition and feedback system can track and provide a longitudinal history of communications.

By increasing ease, availability, and efficiency, the emotive recognition and feedback system can increase the amount of communication that can take place between institutions or other entities and its customers. Furthermore, intelligent monitoring and tracking of communications and interactions with the emotive recognition and feedback system and available services can allow the emotive recognition and feedback system to provide personalized and customized communication support such as video messages and proposed responses. As such, one or more embodiments can increase satisfaction of customers or members and help build an emotional tie between the customers or members and the institution or other entity.

In one or more embodiments, the emotive recognition and feedback system provides an emotive response software development kit to third party users/systems/services. The emotive response software development kit (or "SDK") includes instructions that causes the third-party users/systems/services to send either raw data (video of a video chat of parties on both sides of the video chat or screen shots of the video chat) or emotive data points back to the emotive recognition and feedback system. The emotive recognition and feedback system processes the raw data or emotive data points and returns real time communication support to aid a support representative in understanding and responding to the emotive state of a consumer/member.

For example, the emotive recognition and feedback system can perform emotion detection and provide a real-time feedback based on the emotion detection to one or more users in real time. The emotive recognition and feedback system can base the real-time feedback on the analysis of a real time emotion between two or more users in real time. In other words, the emotive recognition and feedback system can base the feedback on a combination of real-time emotive states of two or more users. Thus, the emotive recognition and feedback system can provide real-time communication engagement coaching and communication support based on the emotive state of one or more users in a video chat.

In addition to providing real-time emotive analysis and feedback, the emotive recognition and feedback system can optionally provide delayed analysis and/or feedback. For example, a user can record themselves speaking. The emotive recognition and feedback system can analyze the video of the user speaking and save the analysis or provide the analysis in real-time while the user is recording. The emotive recognition and feedback system can further allow the user to review the emotive analysis of the video. The user can then share the previously recorded video to one or more other users. The emotive recognition and feedback system can then perform and emotive analysis of the viewers of the video. The emotive recognition and feedback system can then combine the analysis of the viewers and the user. For example, the emotive recognition and feedback system can map an aggregate group response over the user's emotive analysis.

Still further, in addition to individually recorded videos, the emotive recognition and feedback system can allow for importation of pre-existing videos to be analyzed. The emotive recognition and feedback system can further allow a user to review the emotive analysis of the pre-existing video. The user can then share the previously recorded video to one or more other users. The emotive recognition and feedback system can then perform and emotive analysis of the viewers of the pre-existing video. The emotive recognition and feedback system can then combine the analysis of the pre-existing viewers and the analysis of the pre-existing video. For example, the emotive recognition and feedback system can map an aggregate group response over the emotive analysis of the original video.

The emotive recognition and feedback system provides a number of advantages over conventional customer service communication systems. For example, the emotive recognition and feedback system can improve accuracy relative to conventional systems. Specifically, the emotive recognition and feedback system can analyze visual and audio data of both customers or members and support agents. Thus, not only does the emotive recognition and feedback system analyze emotive data from one individual in a communication session; rather, the emotive recognition and feedback system analyzes the emotive data of all users in a communication session and also determines the interactive score by mapping the emotions of all the users in the communication session. Accordingly, the emotive recognition and feedback system can utilize a number of new data points to accurately identify recommended actions to improve the quality of the communication.

Furthermore, the emotive recognition and feedback system can also improve efficiency. For example, the emotive recognition and feedback system can reduce computing resources utilized to record, send, and analyze video data. In particular, instead of sending entire video data streams from multiple individual client devices to a server, the disclosed system identifies video segments for which the client devices send data. Therefore, the emotive recognition and feedback system can more efficiently utilize bandwidth resources in sending data between client devices and the server. Furthermore, in one or more embodiments, the client devices can send emotive data points to a server for processing. Because individual client devices may process video to produce emotive data points, the processing burden can be distributed among client devices instead of being concentrated at a single server. Thus, the emotive recognition and feedback system can also more efficiently utilize processing resources.

The emotive recognition and feedback system is also more efficient to use relative to conventional customer service communication systems. In particular, the emotive recognition and feedback system can generate and provide a variety of resources to a support agent. For example, the emotive recognition and feedback system tracks individual video chat segments, entire video chats, and chats over a period of time. Additionally, the emotive recognition and feedback system can provide interaction scores that indicate the quality of interactions between a support agent and a customer. The emotive recognition and feedback system provides for display a graphical user interface that allows support agents to identify interaction scores and emotion positivity scores for both support agents and customers.

As illustrated by the foregoing discussion, the present disclosure utilizes a variety of terms to describe features and advantages of the emotive recognition and feedback system. As used herein, "video," "video chat session," or "video chat") refers to a data involving audio and video. For example, during a video, a computer device can record at least one user and capture audio and video of the user. A video can be of a single user, can be a video chat between multiple users, or a video of a user watching a video of another user. In the case of a video chat, a computing device can establish logical connections with one or more connected computer devices to send and receive digital data including audio and video data streams. In addition, a video chat communication session can connect one or more client devices associated with support agents to one or more other client devices associated with other users.

As used herein, the term "segment of a video" (or "video segment") refers to a segment of a video. In particular, video segment refers to a segment of the video that the emotive recognition and feedback system identifies and analyzes to generate feedback (e.g., real-time feedback). For example, the emotive recognition and feedback system identifies a time frame of video data from all participants or viewers of a video and analyzes the video segment. The emotive recognition and feedback system can identify and analyze a number of video segments for a single video. The emotive recognition and feedback system can determine the amount of time to lapse between each analyzed video segment and determine the length of each analyzed video segment.

As used herein, the term "support agent" refers to a person acting in a support capacity. In particular, support agent refers to a user of a client device in a video chat session who receives real-time feedback in order to improve the interactive emotional quality of the video chat. For example, support agent can refer to a customer service representative. Although the term support agent refers specifically to a user in a customer service capacity, it will be understood that any client device user in a peer-to-peer interaction may also receive suggestions and recommendations. Indeed, all members in a peer-to-peer video chat can also receive recommendations and feedback.

As used herein, the term "customer" refers to a person in need of goods or services. In particular, the term customer can refer to a participant in a video chat session who is interacting with a support agent. The emotive recognition and feedback system monitors customers' emotive states in order to identify recommendations to send to the support agent. A customer who is engaged with a support agent in a video chat session may not receive the same information, feedback, and recommendations as will the support agent.

As used herein, "video data" refers to information collected about a video. For example, video data can be collected at a client device involved in a video chat communication session. In particular, a client device sends video data to the emotive recognition and feedback system. Video data can comprise either raw data (video of a video chat of users on both sides of the video chat or screen shots of the video chat) or emotive data points from an analyzed video chat segment. Alternatively, video data can comprise a recording of a first user in a first video. Along related lines, video data can comprise a recording of one or more additional users viewing the first video of the first user. Thus, the emotive recognition and feedback system can analyze video data from a video chat or video data from a video and viewers of a time delayed showing of the video. The emotive recognition and feedback system can perform emotion detection on the received video data to provide a communication recommendation to the connected client devices.

Referring now to the figures, FIG. 1, illustrates an embodiment of an environment 100 in which an emotive recognition and feedback system 104 can operate. As illustrated in FIG. 1, the environment 100 includes server(s) 102 (also called herein an emotive response server) which includes an emotive recognition and feedback system 104 and an analytics database 105. Additionally, as illustrated, the system 100 includes third-party web service 106 and third-party web service 108. Although the environment 100 of FIG. 1 is depicted as having various components, the environment 100 may have any number of additional or alternative components (e.g., any number of servers, client devices, databases, or other components in communication with the emotive recognition and feedback system 104 via the network 114). Accordingly, the emotive recognition and feedback system 104 can analyze data from any number of databases/sources to analyze emotive states and generate real-time feedback, training, and recommendations based on the detected emotive states. Furthermore, more than one component or entity in environment 100 can implement the operations of the emotive recognition and feedback system 104 described herein. To illustrate, the emotive recognition and feedback system 104 can alternatively be implemented on the $3^{rd}$ party web services 106, 108 and/or be part of another component or system. According to one or more embodiments, the emotive recognition and feedback system 104 can be implemented in another system, such as an analytics engine.

The server(s) 102 illustrated in FIG. 1 can include, support, or be a part of a web server, a program server, an application server, a datacenter, or a combination of server devices as described below in relation to FIG. 11. As further shown in FIG. 1, the server(s) 102 host the emotive recognition and feedback system 104. The emotive recognition and feedback system 104 can collect analytics data associated with various services, such as services provided to users of the third-party web services 106 and 108. The third-party web services can comprise devices that support client devices that access a client application that enables video communications over a network with another client device or a web server that hosts one or more services that includes video communications. For example, the emotive recognition and feedback system 104 can collect video data from the third-party web services 106 and/or 108. For example, in one or more embodiments, the emotive recognition and feedback system 104 causes a third-party service 106/108 to transmit video data to the emotive recognition and feedback system 104. In one or more embodiments, the emotive recognition and feedback system 104 provides an SDK that includes instructions that when executed by a server or client device, causes the server or client device to collect and send what data and in what format. In some embodiments, the emotive recognition and feedback system 104 uses emotion detection to provide real-time communication recommendations (i.e., feedback) based on received video data. As will be explained below, the emotive recognition and feedback system 104 can send communication recommendations to the third-party web services 106 and 108.

As illustrated in FIG. 1, the emotive recognition and feedback system 104 can send video data to third-party web service in a variety of ways. For example, in one or more embodiments, the emotive recognition and feedback system 104 causes the third-party web service 106 and/or web service 108 to transmit video data to the emotive recognition and feedback system 104. In one or more embodiments, the emotive recognition and feedback system 104 provides a Software Development Kit (or "SDK") that includes instructions that when executed by a web service, causes the web service to collect and send what data and in what format.

The server(s) 102 can access the emotive recognition and feedback system 104 to perform emotion detection and provide video chat recommendations to the users. In particular, and as will be discussed in further detail below, the emotive recognition and feedback system 104 receives video data from the third-party web service 106/108. For example, the emotive recognition and feedback system 104 can process the received video data, and based on identifying an intersection of the video data from a first client device and a second client device, the emotive recognition and feedback system 104 can determine a prompt, recommendation, or real-time feedback to provide to one of the users. The third-party web services 106 and 108 can comprise different services provided by different entities. For example, the third-party web service 106 can comprise a financial institution that provides a video chat service between a customer service agent and a customer. Alternatively, the third-party web service 106 can comprise an academic research institution, a retail institution, a healthcare institution, a personal service institution, a communications system, or other institution/web-based system that provides video chat services. The emotive recognition and feedback system 104 can provide emotive based analytics to multiple different third-party web services from the same or different types of institutions, as represented by the two different third-party web services 106, 108.

It should be noted that, although the emotive recognition and feedback system 104 functions to cause server(s) 102 or client devices to perform the operations that will be described, for the purpose of convenience and simplicity, the following discussion will describe the emotive recognition and feedback system 104 as performing the operations. As illustrated in FIG. 1, the analytics database 106 and the third-party web services 106/108 may be embodied as separate components from the emotive recognition and feedback system 104; as such, they may communicate with the emotive recognition and feedback system 104 through a suitable communications protocol. Though FIG. 1 illustrates the analytics database 105 configured to communicate with the emotive recognition and feedback system 104 directly, one or more embodiments may configure the analytics database to communicate with the emotive recognition and feedback system 104 through the network 114. Additionally, FIG. 1 illustrates the analytics database 105 as a separate component; however, the analytics database 105 may be integrated into another component, such as the emotive recognition and feedback system 104. Similarly, the emotive recognition and feedback system 104 can be integrated with one or more of the third-party web services 106/108.

Figure 2:
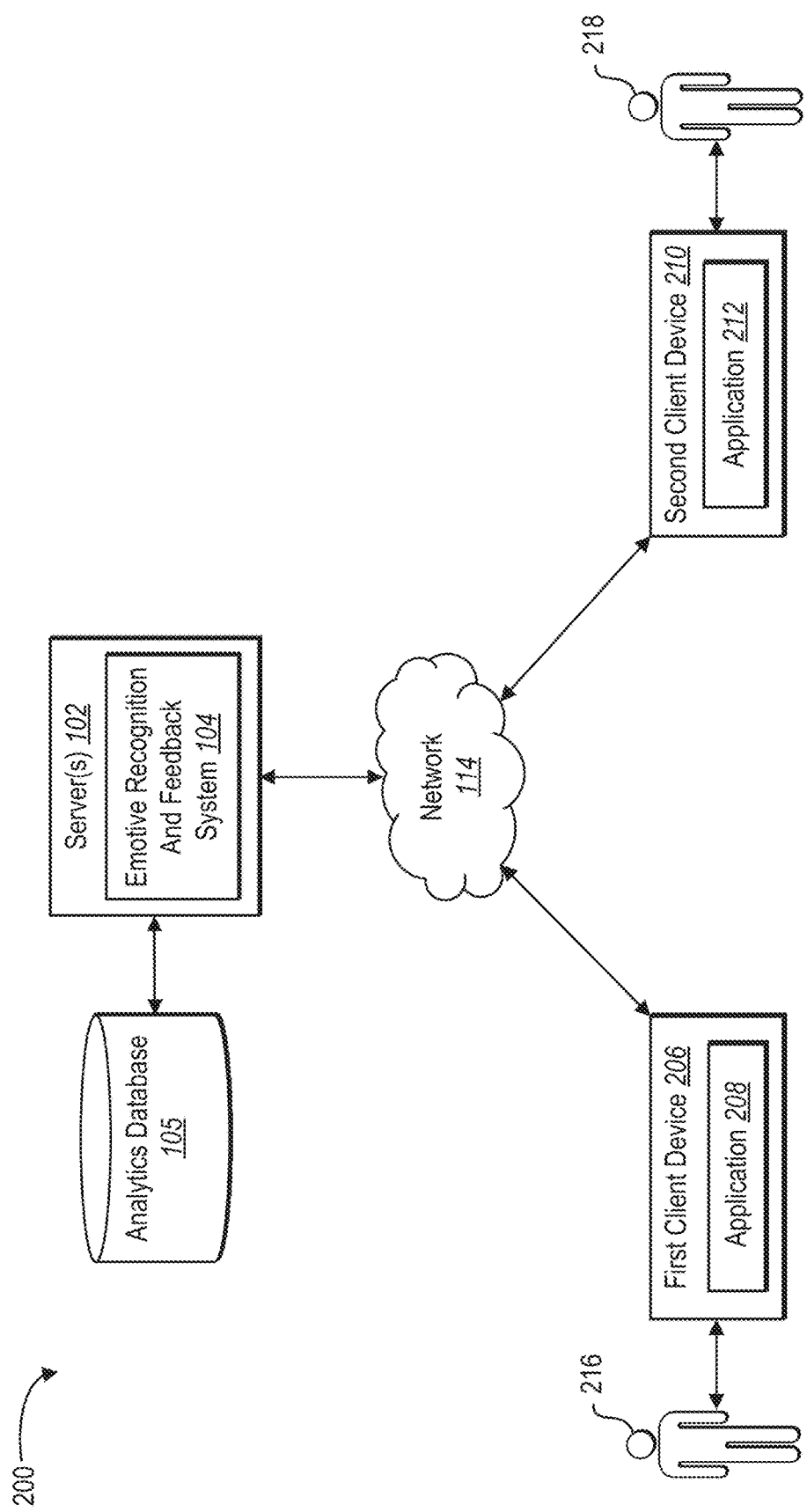
FIG. 2 illustrates another environment in which the emotive recognition and feedback system can operate in accordance with one or more implementations of the present invention.

Turning now to FIG. 2, as discussed previously with respect to FIG. 1, the third-party web services 106/108 can comprise client devices that access a client application that enable video communications over a network with another client device. FIG. 2 illustrates another environment in which the emotive recognition and feedback system 104 can operate in accordance with one or more embodiments disclosed herein. As illustrated in FIG. 2, the environment 200 includes server(s) 102 which hosts the emotive recognition and feedback system 104, a first client device 206 associated with a first user 216, and second client device 210 associated with a second user 218. Also, as illustrated in FIG. 2, environment 200 includes the network 114. As illustrated, the environment 200 includes an application 208 on the first client device 206 and an application 212 on the second client device 210. FIG. 2 shows only one example and other embodiments of the system 200 may include any number of additional server(s) 102, first client devices 206, and second client devices 210.

As illustrated in FIG. 2, the server(s) 102, first client device 206, second client device 210, and/or additional client devices are communicably connected through the network 114. In some configurations, the network 114 can be the Internet, an intranet, a private network, or another type of computer network. The network 114 can be a combination of Internet and intranet networks, or any of the networks described below in relation to FIG. 11. Although FIG. 2 illustrates a particular arrangement of components, various additional arrangements are possible. For example, the first client device 106 and the second client device 110 can communicate directly with the server(s) 102.

Although the system 200 of FIG. 2 is depicted as having various components, the environment 200 may have any number of additional or alternative components (e.g., any number of servers, client devices, databases, or other components in communication with the emotive recognition and feedback system 104 via the network 114). Accordingly, the emotive recognition and feedback system 104 can analyze data from any number of databases/sources to analyze emotive states and generate real-time feedback, training, and recommendations based on the detected emotive states. Furthermore, more than one component or entity in environment 200 can implement the operations of the emotive recognition and feedback system 104 described herein. To illustrate, the emotive recognition and feedback service 104 can alternatively be implemented on client devices and/or be part of another component or system.

As illustrated in FIG. 2, the first client device 206 and the second client device 210 may connect to the server(s) 102 via the network 114. For example, the first client device 206 and the second client device 210 may include, but are not limited to mobile devices (e.g., smartphones, tablets), laptops, desktops, network phones (e.g., VoIP devices), or any other type of computing device, such as those described below in relation to FIG. 12.

In one or more embodiments, application 208 and application 212 (collectively "applications 208 and 212") of FIG. 2 are installed as software, hardware, or a combination of software and hardware on the first client device 206 and the second client device 210. The client applications 208/212 (e.g., a video chat application) that allows the users to perform video chats. For example, the video chat application can include a software application installed on the client devices. Additionally, or alternatively, a third-party web server or the emotive recognition and feedback system 104 can include a software application hosted on server(s), which may be accessed by the client devices through another application, such as a web browser.

The applications 208 and 212, can collect video data from the first client device 206 and the second client device 210 respectively. The applications 208 and 210 can collect either raw data (video of a video chat or screen shots of the video chat) or emotive data points, to the emotive recognition and feedback system 104. For example, the application 208 can collect video data from video captured at the first client device 206 of the first user 216 in the video chat communication session. The application 208 will send the collected video data to the emotive recognition and feedback system 104. Accordingly, the application 212 will collect video data collected at the second client device 210 of video of the customer 210. The application 212 sends, to the emotive recognition and feedback system 104, video data associated with the second client device 210.

As will be discussed in further detail below, and as illustrated in FIG. 2, the emotive recognition and feedback system provides one or more user interfaces to be displayed by the application 208 at the first client device 206 associated with the first user 216. For example, the first user 216 associated with the first client device 206 can represent a support agent in a video chat session. The emotive recognition and feedback system 104 sends, to the application 208, a user interface including a prompt, recommendation, or real-time feedback to present to the first user 216 in order to improve the interactive emotive quality of the video chat communication session.

In at least one embodiment, the emotive recognition and feedback system 104 does not send, to the application 212 of the second client device 210, the same real-time feedback as the emotive recognition and feedback system 104 sends to the application 208 on the first client device 206. For example, the second user 218 associated with the second client device 210 of FIG. 2 can represent a customer. Therefore, while the emotive recognition and feedback system 104 may send communication recommendations to the first client device 206, the emotive recognition and feedback system 104 may not send communication recommendations to the second client device 210. Indeed, the graphical user interface presented at application 212 of the second client device 210 can be different from the user interface presented at application 208 of the first client device 206.

In alternative embodiments, and as will be discussed in further detail below, the emotive recognition and feedback system 104 may present communication recommendations at all client devices involved in a video chat session. For example, the emotive recognition and feedback system 104 may send communication recommendations to both the first client device 206 and the second client device 210.

Figure 3:
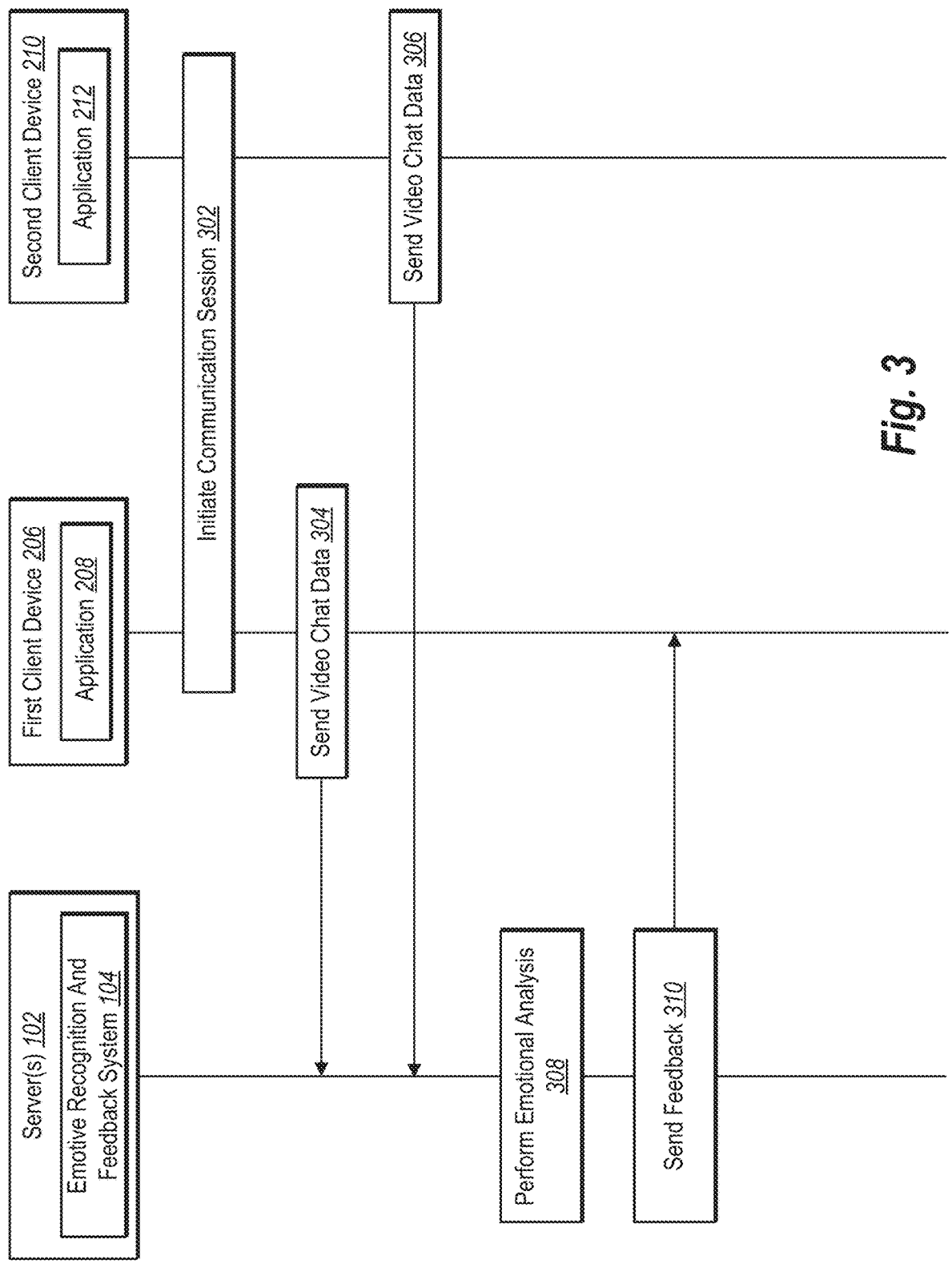
FIG. 3 illustrates an example sequence-flow diagram of the interactions in a process of analyzing the emotive state of a communications session in accordance with one or more implementations of the present invention.

Additional details regarding the specifics of the emotive recognition and feedback system 104 are explained below with respect to FIG. 3. Turning now to FIG. 3, FIG. 3 illustrates an example sequence-flow diagram demonstrating interactions between server(s) 102, the first client device 206 and the second client device 210. As illustrated, the server(s) 102 include the emotive recognition and feedback system 104, the first client device 206 includes application 208, and the second client device 210 contains application 212. In particular, FIG. 3 illustrates an example sequence of acts 300 within the system 100 to allow the server(s) 102 to send a feedback to the first client device 206 based on data from a video chat communication session involving the first client device 206 and the second client device 210.

In act 302 of FIG. 3, the first client device 206 initiates a communication session with the second client device 210. In one or more other embodiments, the second client device 210 associated with the second user initiates the communication session with the first client device 206 associated with the first user. As part of act 302, the first client device 206 begins sending video streams to the second client device 210. In at least one embodiment, the first client device 206 sends video streams to the second client device 210 via server(s) supported by a third-party service as described above. In particular, the first client device 206 sends video and audio data streams to the server(s) and the server(s) forward the video and audio data streams to the second client device 210. Additionally, as part of action 302, the second client device 210 sends video media streams to the first client device 206.

In act 304 of FIG. 3, the first client device 206 sends video data 304 to the server(s) 102. In at least one embodiment, the video data comprises data from segments of the video chat communication session. For example, as part of act 304, the emotive recognition and feedback system 104 collects analytics data associated with various services, such as services provided to users of third-party web services. Additionally, the emotive recognition and feedback system 104 can collect video data, from the server(s) 102 or client devices 206 and 210. The emotive recognition and feedback system 104 collects the analytics data in a variety of ways. For example, in one or more embodiments, the emotive recognition and feedback system 104 causes a third-party server or client device to transmit video data to the emotive recognition and feedback system 104. In alternative embodiments, the emotive recognition and feedback system 104 provides an SDK that includes instructions that when executed by a server or client device, causes the server or client device to collect and send what data and in what format.

For example, in one or more embodiments, the emotive recognition and feedback system 104 collects and stores only the raw data points which includes the emotional response data codes, the emotive algorithm values, date time, session, and other relevant data. The emotive recognition and feedback system 104 collects and stores such raw data to allow for reconstruction of a video call and the interaction between a support agent and a customer. Using the collected data, the emotive recognition and feedback system 104 can generate historical reporting and graphing. Furthermore, the emotive recognition and feedback system 104 can use the data to capture result type information, such as the outcome of the call as rated by the support agent (e.g., did the support agent sell a product? did the support agent resolve a customer's concern?). The emotive recognition and feedback system 104 can use the data to modify and improve the support agent/customer interaction algorithm. In one or more embodiments, the emotive recognition and feedback system 104 stores the data in the server(s) 102. In such embodiments, the third-party server or the client device can comprise the instructions provided by the emotive recognition and feedback system 104 that cause the third-party server or client device to perform facial coding or vocal coding to analyze video and provide only the results of the facial coding or vocal coding. The emotive recognition and feedback system 104 then analyzes/combines the results and provides real-time feedback/recommendations.

In alternative embodiments, the emotive recognition and feedback system 104 causes a third-party server or client device to transmit video data to the emotive recognition and feedback system 104. As illustrated in FIG. 3, the emotive recognition and feedback system 104 can cause the first client device 206 to send video data as part of act 304. In one or more embodiments, the emotive recognition and feedback system 104 provides a Software Development Kit (or "SDK") that includes instructions that when executed by a server or client device, causes the server or client device to collect and send what data and in what format. In particular, the SDK that includes instructions that cause the third-party server a client device to capture screen shots of both participants of a video call at predefined intervals. The third-party server or client device then send the screen shots (and optionally audio clips) of both participants of the video call to the emotive recognition and feedback system 104, which performs facial and/or voice coding. The emotive recognition and feedback system 104 then analyzes/combines the results and provides real-time feedback/recommendations.

One will appreciate in light of the disclosure herein, that the emotive recognition and feedback system 104 can provide increased flexibility and a robust platform while also uses less processing power and data storage. In particular, by the use of the SDK and the instructions included therein, the emotive recognition and feedback system 104 can store and process smaller amounts of data, while providing accurate analysis. In particular, if the emotive recognition and feedback system 104 stored all of the videos captured from the video sessions, the storage and processing power requirements would be very large. In particular, one minute of HD video is about 250 MB, as such a single stored video call could be approximately 3.5 GB or more. The forgoing storage methods and the use of the SDK allows the emotive recognition and feedback system 104 to retain the data from these calls to continually improve the algorithm and recommendations without having to store, transmit, or receive large video files. Thus, the emotive recognition and feedback system 104 solves a technical computer-based problem and improves the functionality of the computing devices hosting the emotive recognition and feedback system 104 (i.e., by not compromising data while also increasing speed (less time to transmit screen shots or emotive scores than entire videos) and reducing storage requirements).

At step 308 of FIG. 3, the emotive recognition and feedback system 104 performs an emotive analysis of the data received from the client devices 206, 2018. For example, the emotive recognition and feedback system 104 performs facial and/or voice analysis to determine the emotional states of individual participants within a video chat session. In particular, the emotive recognition and feedback system 104 can detect facial landmarks, extract face texture features, classify facial actions, and model emotion expressions. In particular, the emotive recognition and feedback system 104 can identify an emotional state based on a combination of facial actions. For example, the emotive recognition and feedback system 104 can use facial coding technology to measure facial expressions of emotion in real time using algorithms to identify key landmarks on the face and analyze pixels in those regions to classify facial expressions. For example, the emotive recognition and feedback system 104 can analyze facial expressions, action units, head gestures, smiles, brow furrows, squints, lowered eyebrows, raised eyebrows, smirks, and attention to determine an emotive state of a user. In one or more embodiments, the emotive recognition and feedback system 104 measures seven emotion metrics using facial coding technology: joy, surprise, neutral, sadness, disgust, anger, and fear.

Additionally, the emotive recognition and feedback system analyzes vocal expressions to identify an emotional state. For example the emotive recognition and feedback system 104 can use vocal coding to observe changes in speech paralinguistics such as tone, loudness, tempo, and voice quality to distinguish emotions. In one or more embodiments, the emotive recognition and feedback system 104 measures the same seven emotion metrics discussed above: joy, surprise, neutral, sadness, disgust, anger, and fear.

Optionally, the emotive recognition and feedback system 104 calculates a communication effectiveness score as part of the emotive analysis. To provide the communication effectiveness score, the emotive recognition and feedback system 104 calculates various scores of analysis of the emotive states of participants in a video chat. As used herein, "communication effectiveness score" refers to a score reflecting the effectiveness of communication within a communication session. In particular, communication effectiveness score indicates the effectiveness of a communication session based on the interacting emotional states of all participants within the communication session. For example, the communication effectiveness score can refer to an Emotional Interactive Positivity score. For example, and as will be discussed in further detail below with respect to FIGS. 4A-4C, the emotive recognition and feedback system 104 can first generate and provide individual emotion positivity scores ("EPS" or "EP scores") corresponding to the emotional state of each user. The EPS can comprise a score that indicates a current emotive state of a user and a percentage indicating a strength of the identified emotion. As part of calculating the communication effectiveness score 308, the emotive recognition and feedback system 104 determines how the EPS of both the first user associated with the first client device 206 and the second user associated with the second client device 210 interact.

Based on the communication effectiveness score the emotive recognition and feedback system 104 can determine that the communication session is one that needs communication support. For example, in some embodiments, the emotive recognition and feedback system can determine a threshold EIPS value, and if the EIPS for a communication session falls below the threshold EIPS value, the emotive recognition and feedback system will determine that the first user associated with the first client device is in need of support. When the emotive recognition and feedback system 104 determines that the first user associated with the first client device 206 is in need of support, then the emotive recognition and feedback system 104 sends feedback 310 to the first client device 206. For example, the emotive recognition and feedback system 104 can provide a reporting suite that includes various scores of analyses of the emotive states of participants in a video chat.

Figure 4A:
FIG. 4A illustrates an example emotive response spectrum in accordance with one or more implementations of the present invention.
Figure 4B:
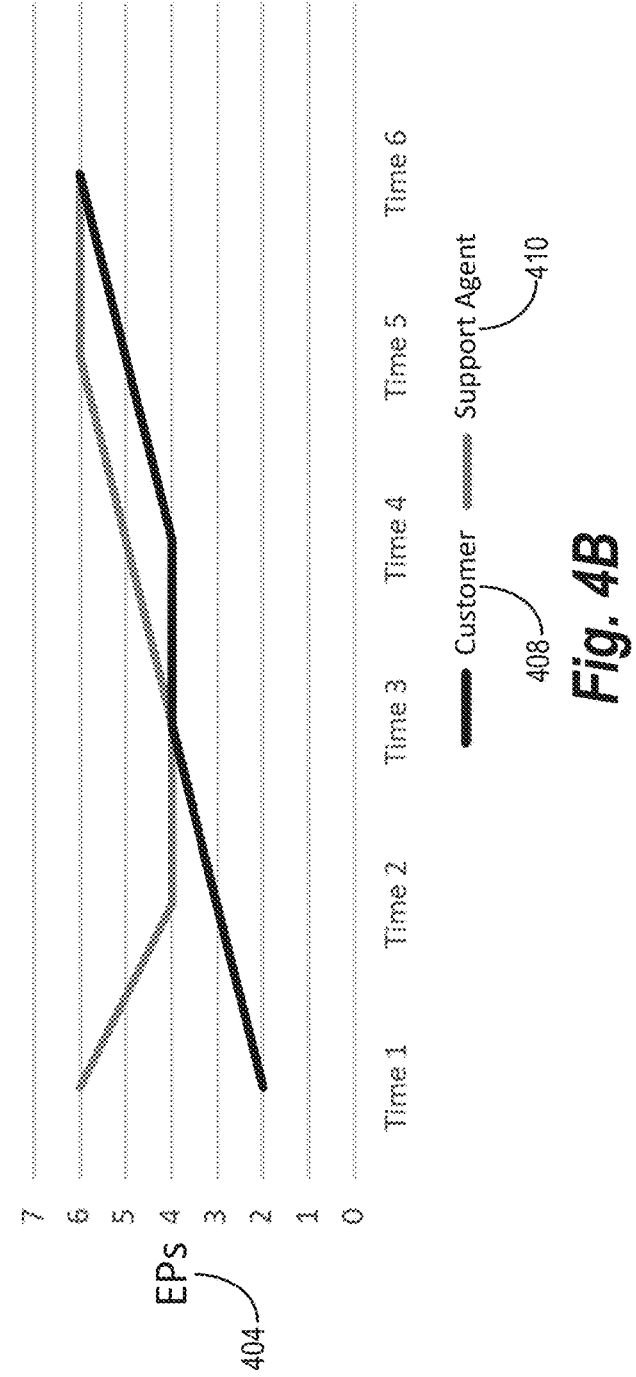
FIG. 4B illustrates a timeline displaying changes of emotive states between a customer and agent in accordance with one or more implementations of the present invention.

The emotive recognition and feedback system 104 can evaluate the interaction between the emotive states of two or more unique users. For example, the emotive recognition and feedback system 104 can identify the emotional expression for each user and evaluate the interaction effect of those emotions. In particular, the emotive recognition and feedback system 104 can perform dynamic emotive recognition based on an interactive video engagements matrix. FIGS. 4A-4C illustrate exemplary individual emotion positivity scores for an individual user, and an example of how two emotion positivity scores from two different users can interact. More specifically, FIG. 4A illustrates an example continuous scale of emotional positivity scores ("EPS"). FIG. 4B illustrates an emotional call journey for a communication session between a customer and a support agent. FIG. 4C illustrates an example coded emotive interactivity matrix that generates emotional interactive positivity scores. Each of FIGS. 4A-4C will now be discussed in additional detail.

FIG. 4A illustrates an example emotive response spectrum in accordance with one or more implementations of the present invention. As mentioned previously, the emotive recognition and feedback system 104 can perform an analysis of interactions between, and the emotive states of, two or more distinct users during a video call. For example, the emotive recognition and feedback system 104 can perform in-session multimodal (facial and vocal) emotion recognition. The emotive recognition and feedback system 104 can analyze the emotional experience of two or more users simultaneously in real time for the duration of a peer-to-peer video call. The emotive recognition and feedback system 104 can use algorithms developed to evaluate and interpret the facial and vocal expression data together to create an accurate assessment of each unique user's emotional experience in real time.

As part of calculating a communication and effectiveness score, the emotive recognition and feedback system 104 determines EPS for all users within a video communication session. More specifically, when the emotive recognition and feedback system 104 receives video data from the client devices, the emotive recognition and feedback system 104 performs facial coding or vocal coding to analyze the video segment. For example, the emotive recognition and feedback system 104 can analyze facial expressions, action units, head gestures, smiles, brow furrows, squints, lowered eyebrows, raised eyebrows, smirks, and attention to determine an emotive state of a user. In one or more embodiments, the emotional states can be mapped to numbers on a continuous scale between 1 and 7. As illustrated in FIG. 4A, the score 1 is correlated with fear, 2 is correlated with anger, 3 is correlated with disgust, 4 is correlated with sadness, 5 is correlated with neutral, 6 is correlated with surprise, and 7 is correlated with joy. The emotive response system can generate an EPS for each of the users. In particular, the EPS can comprise an emotional state and a percent value indicating the strength of the emotional state.

For example, facial expressions can have a positive or negative effect on an emotive state of a user. For example, a smile increases a score associated with joy while a brow raise, brow furrow, or frown can decrease a score associated with joy. A brow furrow, eye lid tighten, eye widen, chin raise, lip suck, or frown can increase a score associated with anger while a smile or brow raise can decrease a score associated with anger. Similarly, detected facial expressions can increase or decrease scores associated with other emotive states, disgust, surprise, fear, sadness, contempt, neutral, etc.

In one or more embodiments, the emotive recognition and feedback system 104 calculates the EPS. In alternative embodiments, the emotive recognition and feedback system 104 leverages a third-party service to generate the EPS. In any event, the emotive recognition and feedback system 104 can use the EPS from the individual communication session participants to generate and provide individual video call analyses of an individual and/or interactive emotional journeys during a video call. For example, FIG. 4B illustrates a video call analysis that maps both the EPS of a customer 408 and of a support agent 410 over time. As illustrated, the EPS have been converted by the emotive recognition and feedback system 104 to numbers on the emotive response spectrum.

As illustrated in FIG. 4B, the emotive recognition and feedback system 104 analyzes the video data from both the customer 408 and the support agent 410 for different video segments. For example, the emotive recognition and feedback system 104 analyzes video data at distinct times (e.g., time 1, time 2, etc.). By analyzing video data at different time intervals, the emotive recognition and feedback system 104 can conserve computing resources while still providing real-time feedback through the duration of a video chat session.

The emotive recognition and feedback system 104 can evaluate the interaction between two or more unique users. For example, the emotive recognition and feedback system 104 can identify the emotive state for each user and evaluate the interaction effect of those emotive states. In particular, the emotive recognition and feedback system 104 can generate a dynamic emotive interactivity matrix. FIG. 4C illustrates an example coded emotive interactivity matrix. The emotive recognition and feedback system 104 can map the emotive state of each user to an axis of the matrix. In other words, the emotive recognition and feedback system 104 matches the current emotional experience of a first user 420 against the current emotional experience of a second user 422.

As illustrated in FIG. 4C, the emotive recognition and feedback system 104 uses codified EPS scores to generate an Emotional Interactive Positivity score ("EIPS" or "EIP score") for each communication session segment. As used herein, the term "Emotional Interactive Positivity score" refers to a score that reflects the emotional positivity of an interaction between two or more users in a communication session. In particular, an EIP can be based on EPS for two or more users as well as a score of the interaction between the two users. While EPS indicate an individual user's emotional state at a particular point in time, EIPS reflect the interactivity of the emotive states of multiple users within a communication session. As illustrated, the emotive interactivity matrix can identify an EIPS for a first user 420 and a second user 422 by graphing the codified EP scores for the first user 420 against the codified EP scores for the second user 422.

The generated EIPS for a communication session if both users have generally positive EPS is higher than the generated EIPS for a communication session where both users have generally negative EPS. For example, a communication session for where the emotive recognition and feedback system identifies both the first user 420 and the second user 422 in a joyful emotional state (codified as 6), the corresponding EIPS would be 6. If the emotive recognition and feedback system 104 codes the first user as 4 (neutral), and the second user is coded as 0 (fear), the interaction between the two EP scores (−2) becomes the EIP score. Additionally, and as will be discussed in further detail below, the EIP scores generated using the emotive response matrix of FIG. 4C can be displayed at a support client device. While FIG. 4C illustrates a matrix for two participants, the emotive recognition and feedback system 104 can also generate matrices that include additional users (e.g., 3, 4, 5, 10).

Figure 5:
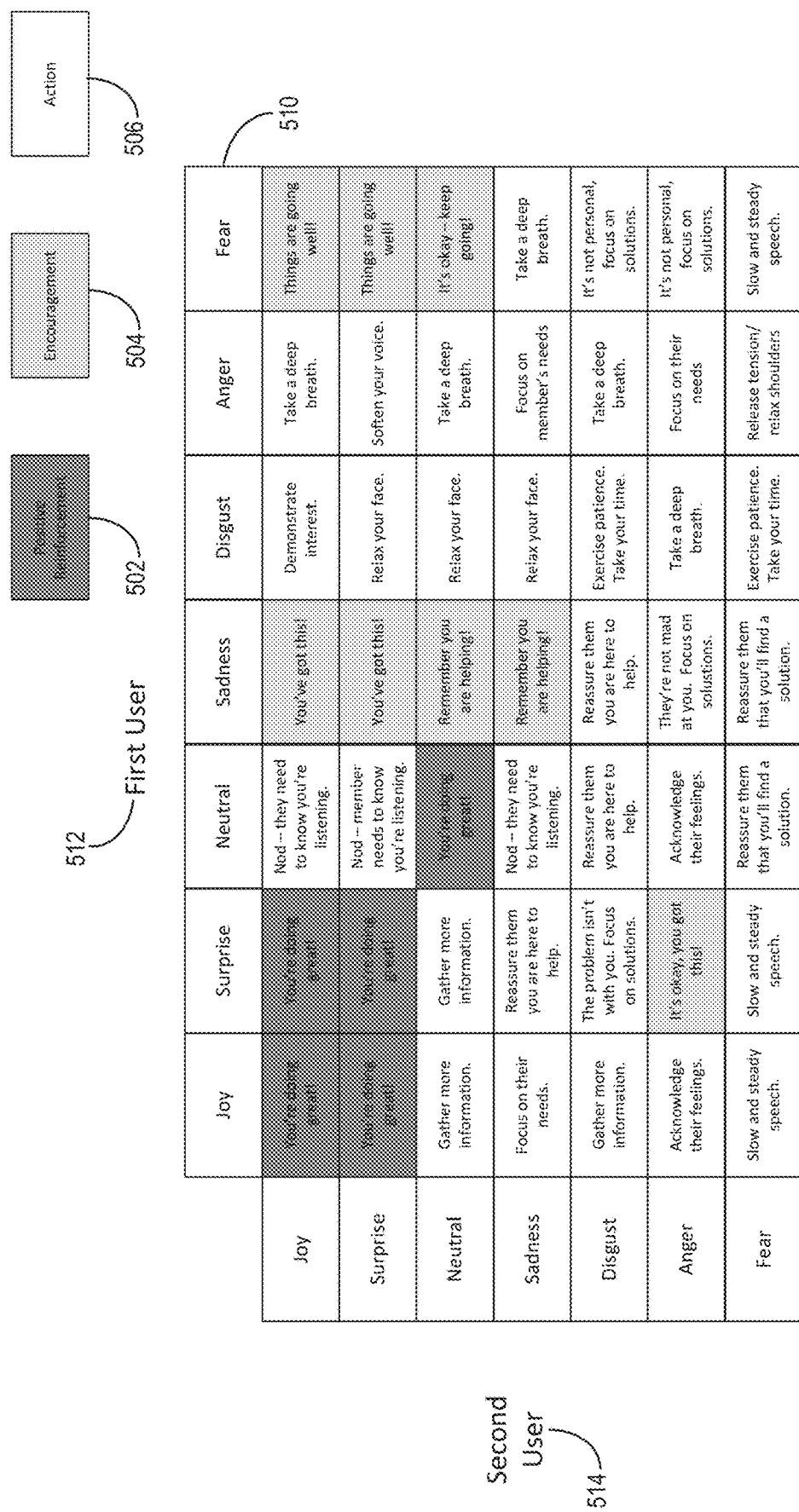
FIG. 5 illustrates an example emotive response matrix in accordance with one or more implementations of the present invention.

FIGS. 4A-4C illustrate identifying EPS for individual users and using the EPS to generate EIPS. In some embodiments, EIPS indicate whether a communication session requires assistance, i.e., has a low EIPS score. In addition to determining the EIPS, the emotive recognition and feedback system can identify specific feedback for at least one user involved in a communication session based on the emotional states of all the users within a communication session. FIG. 5 illustrates an example dynamic emotive response matrix in accordance with one or more implementations of the present invention.

The emotive recognition and feedback system 104 identifies an intersection of a first user 512 emotive state and a second user's 514 emotive state to identify a prompt, recommendation, or real-time feedback to provide to one of the users. In particular, and as illustrated in FIG. 5, the emotive recognition and feedback system can provide prompts including positive enforcement 502, encouragement 504, or suggested actions 506. The emotive recognition and feedback system 104 uses the interaction between the first user's 512 and the second user's 514 EP scores to determine the real-time communication prompt designed to improve communication between users. For example, a communication where the emotive recognition and feedback system 104 identifies that the first user 512 is in a neutral emotional state but the second user 514 is in a sad state, the emotive recognition and feedback system 104 will send, to the first user 512, a suggested action to "nod—they need to know you're listening."

Furthermore, the emotive recognition and feedback system can adapt and change as the database of data grows and the analytics of real-time data points continue to inform future development of the algorithms employed by the emotive recognition and feedback system.

As discussed above, the emotive recognition and feedback system can provide real-time support. In particular, the emotive recognition and feedback system can provide one user with feedback (e.g., in a customer-support agent model or facilitator-group model) or both users with feedback (e.g., in a peer-to-peer model) to support improved communication between users. For example, the emotive recognition and feedback system 104 can provide a customer-support agent video model in a consumer setting. For example, and as illustrated in FIG. 5, first user 512 is a support agent entering a video call with the Second user 514, a customer, where the support agent will use the emotive recognition and feedback system 104 to better assist the customer.

Additionally, the emotive recognition and feedback system 104 can provide a Peer-to-Peer video model. In such cases, the emotive recognition and feedback system can work in conjunction with a peer-to-peer video call. In this case, the emotive recognition and feedback system can provide both users with support and recommendations as they work to establish better communication through casual video conversations. For example, the emotive recognition and feedback system 104 can provide, to each user in a communication session, feedback as if they were the first user 512 as illustrated in FIG. 5.

Furthermore, the emotive recognition and feedback system can provide a Facilitator-Group video model. In particular, the emotive recognition and feedback system can support a leader-group video setting. In this use case, the first user 512 is a group facilitator and the second user 514 is one or more of the group participants interacting with the group leader through a video call. The facilitator will use the emotive recognition and feedback system to better communicate with the group.

Based on the specific emotion interaction identified between users in real time, the emotive recognition and feedback system 104 provides one or more users with a recommendation that will be classified into one of three categories: positive reinforcement 502, encouragement 504, or call to action 506. The emotive recognition and feedback system 104 can also provide one or both users real-time support prompts based on the interaction classification. For example, and as illustrated in FIG. 5, if a customer calling in is frustrated or angry and the support agent is happy or joyful, the emotive recognition and feedback system can provide the agent with a prompt suggesting they acknowledge the customer's feelings. By acknowledging the customer's feelings, the customer feels heard and understood. At the same time, through this process of employing empathy, the agent can match the customer's emotional experience and start to improve the experience for the customer based on feedback from the emotive recognition and feedback system 104. Once the call is completed, the emotive recognition and feedback system can provide users with suggestions for communication development videos that will support the in-session prompts. For example: if the emotive recognition and feedback system 104 sent a support agent a prompt to "acknowledge customer's feelings," the emotive recognition and feedback system can provide a communication development video suggestion for "Employing Empathy" that will offer additional insights and tips that can be applied to future calls.

Figure 6:
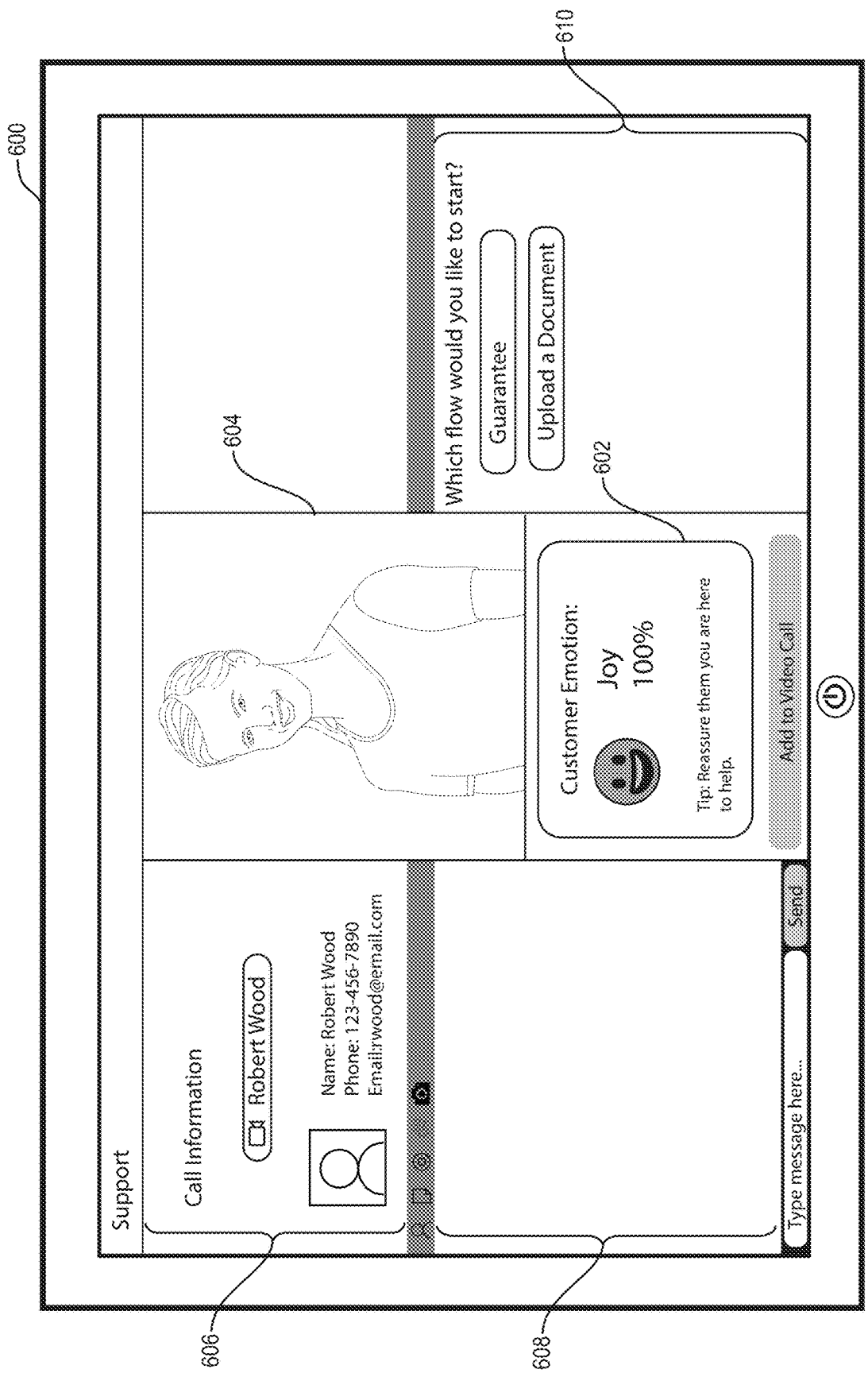
FIG. 6 illustrates an example support agent user interface illustrating emotive response of a consumer in a video chat in accordance with one or more implementations of the present invention.
Figure 7:
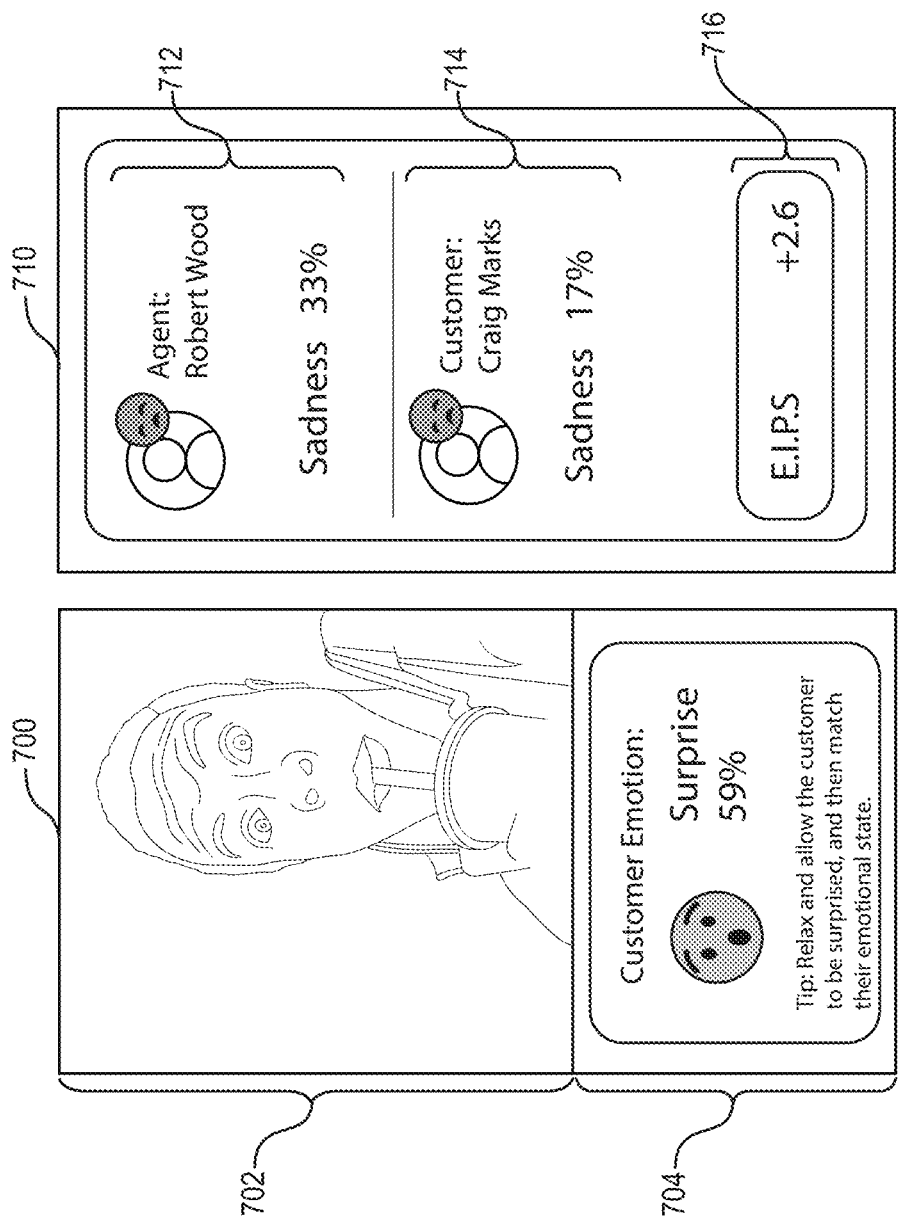
FIGS. 7A-7B illustrates example support agent user interfaces for a mobile device illustrating emotive response of a consumer in a video chat in accordance with one or more implementations of the present invention.
Figure 8:
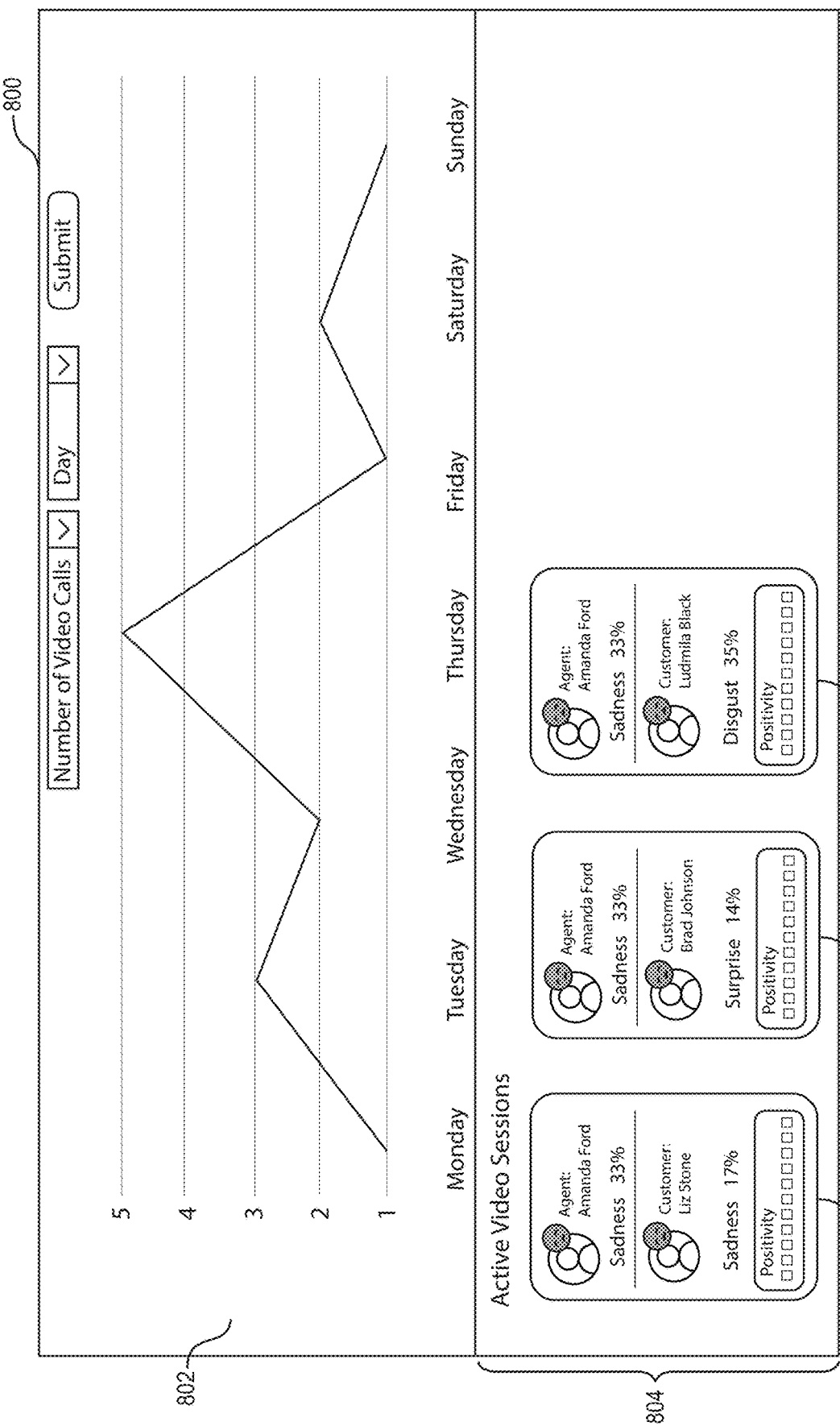
FIG. 8 illustrates an example support agent user interface illustrating emotive response of a consumer in a video chat in accordance with one or more implementations of the present invention.

The emotive recognition and feedback system 104 can also provide one or more graphical user interfaces (or "GUIs"). FIGS. 6-8 illustrate various GUIs presented by the emotive recognition and feedback system 104. The emotive recognition and feedback system 104 can generate and provide the GUIs discussed below in response to an emotive analysis and as part of a feedback on a video chat or other communication. In particular, FIG. 6 illustrates the GUI presented to a support agent of the emotional analysis of the customer in real time. FIG. 7 illustrates an example GUI displayed to the support agent at the support agent's mobile device. Additionally, FIG. 8 illustrates an example GUI that presents a call summary including information for multiple calls. For ease of reference, the GUIs in FIGS. 6-8 are presented to support agents. However, the GUIs in FIGS. 6-8 can also be presented to any user who is not necessarily a support agent but who also receives recommendations to improve the interactive emotional positivity of a video chat session.

FIG. 6 illustrates an example live video chat GUI 600 presented by the emotive recognition and feedback system 104 to a support agent. In particular, the live video chat GUI 600 includes emotional analysis element 602, video element 604, customer information 606, messaging element 608, and presentation element 610. The live video chat GUI 600 provides a support agent with the emotional analysis of the customer being served in real time in a manner that is easy to identify as an emotion across the simplified emotional spectrum: fear, anger, disgust, sadness, neutral, surprise, and joy.

As illustrated in FIG. 6, the emotive recognition and feedback system 104 provides recommendations to the support agent based off of the emotional engagement matrix on how to engage, interact and improve the overall customer experience. In particular, the emotive recognition and feedback system 104 uses emotional analysis element 602 to display in-call recommendations for the benefit of improving the support agent's, and in turn, the represented company's, relationship with the customer. As illustrated in FIG. 6, the emotional analysis element 602 includes the customer's detected emotion, e.g., Joy. The emotional analysis element 602 can include both the basic emotion and the emotion strength, e.g., 100%. Additionally, the emotional analysis element 602 includes the communication recommendation generated using the emotive response matrix discussed above.

Though not illustrated in FIG. 6, emotional analysis element 602 can also provide a support agent the real-time EIPS to identify and understand the interaction delta from the start of the call to the end of the call. For example, the emotive recognition and feedback system 104 can configure the score will on a scale of −6-6, as discussed above with regard to FIG. 4C, with negative six being the lowest (least productive) possible emotional interaction score, and six being the highest (most productive) emotional score that an interaction can receive.

As further illustrated in FIG. 6, the live video chat GUI 600 also includes video element 604. In particular, video element 604 can include the live video feed of a user in the video communication session. In particular, the video element 604 of the video chat GUI 600 includes video feed of the customer.

Additionally, the live video chat GUI 600 of FIG. 6 also includes support agent information element 606. As illustrated in FIG. 6, the customer information element 606 includes the customer's name, contact information, and a selectable video chat element. In particular, when the emotive recognition and feedback system detects selection of the selectable video chat element, the emotive recognition and feedback system initiates a video chat communication session with the customer.

The live video chat GUI 600 in FIG. 6 also includes messaging element 608. The messaging element 608 enables the support agent to initiate text conversation. For instance, the support agent can type a message in the selectable message box and send the message to the customer. The emotive recognition and feedback system thus allows users to communicate both via video chat and also via text chat.

Live video chat GUI 600 of FIG. 6 also includes presentation element 610. Presentation element 610 includes selectable elements correlating to various presentation views. For example, as illustrated in FIG. 6, presentation element 610 includes selectable "Guarantee" and "Upload a Document" elements. When the emotive recognition and feedback system 104 detects user interaction with one of the selectable elements, the emotive recognition and feedback system 104 begins the corresponding presentation. In some embodiments, the presentation is presented on both the support agent's client device and the customer's client device. For example, and as illustrated, the support agent may select the "upload a document" selectable element. The live video chat GUI 600 will update to allow the support agent to upload a document that will be presented on display on the customer client device.

The emotive recognition and feedback system can provide each session(s) emotional interaction positivity score and an overall emotional positivity score that is a combined average of all customer video interactions over time. The emotive recognition and feedback system 104 provides support agents the score of the session at the end of a call and the correlating graph to facilitate understanding of the frequency the Customer and the support agent achieved emotional syncing throughout the call. The emotive recognition and feedback system 104 also provides support agents, at the end of a video session, helpful training videos for the purpose of improving future emotional interactions with customers.

Turning now to FIGS. 7A-7B, example mobile video chat GUI 700 are displayed on a client device associated with a support agent during a video chat session. More specifically, FIG. 7A illustrates mobile video chat GUI during a video chat session. During the video chat session, the support agent may wish to view the EPS of individual users and the combined EIPS for the call. In order to do so, the support agent may interact with selectable elements in the mobile video chat GUI 700 to update the GUI to the mobile score GUI 710 illustrated in FIG. 7B. The mobile score GUI 710 includes EPS for individual callers as well as the EIPS for the entire call.

As illustrated in FIG. 7A, the mobile video chat GUI 700 includes video element 702 and emotional analysis element 704. In particular, video element 702 includes live video from the customer client device. Accordingly, the emotional analysis element provides the customer's EPS as well as a recommendation. For example, as illustrated in FIG. 7A, the emotional analysis element 704 indicates the customer's emotive state (e.g., Surprise) and the strength of the identified emotive state (e.g., 59%). The emotional analysis element 704 also includes the recommendation to "Relax and allow the customer to be surprised, and then match their emotional state." Additionally, the emotional analysis element 704 includes an icon associated with the customer's emotion (e.g., a surprise face icon) for quick reference by the support agent.

In at least one embodiment, the emotional analysis element 704 comprises a selectable element that allows the support agent to navigate to different GUIs during the video chat session. For example, by selecting the emotional analysis element 704, the emotive recognition and feedback system 104 updates the support client device to display the mobile score GUI 710 illustrated in FIG. 7B.

The mobile score GUI 710 illustrated in FIG. 7B includes support information 712, customer information 714, and EIPS element 716. As illustrated, the EPS displayed in the mobile score GUI 710 comprise an indication of the current emotive state of the users (e.g., sadness) and a percentage indicating the strength of the identified emotions (e.g., 33% and 17%). In particular, the support information element 712 includes the EPS for the support agent and the customer information element 714 displays EPS for the customer.

Additionally, the mobile score GUI 710 includes EIPS element 716. EIPS element 716 displays the most recent EIPS reflecting the interaction of EPS for both callers during the most recently analyzed video chat segment for the video chat communication session. For example, based on the support agent EPS and the Customer EPS, the EIPS is +2.6. In some embodiments, the EIPS element 716 automatically updates to present the most recent EIPS.

In at least one embodiment, the mobile score GUI 710 can also include an indication of how the EIPS has changed over the duration of the call. For example, in one embodiment, the mobile score GUI 710 can include an emotional call journey graph similar to the one illustrated in FIG. 4B. In at least one embodiment, the EIPS element 716 is a selectable element that updates the GUI to display the emotional call journey graph. Alternatively, the mobile score GUI 710 can include an EIPS progress score indicating the improvement or decline in the EIPS during the conversation. As used herein, "EIPS progress score" refers to a score indicating how the EIPS has changed during the call. The EIPS progress score is calculated by subtracting the last recorded EIPS from the current EIPS. For example, if the EIPS from the most currently analyzed video segment is 5 and the EIPS from the last analyzed video segment is 2, then the EIPS progress score would equal 5 (most recent EIPS)−2 (last recorded EIPS)=3. The support agent is able to quickly identify the call's progress by referencing the EIPS progress score. A positive EIPS progress score indicates that the EIPS score has increased, thus indicating that the interaction of emotional states of all users within the video chat session has improved. A negative EIPS progress score, on the other hand, demonstrates that the EIPS score has decreased, thus indicating that the interaction of emotional states of all users within the video chat sessions has diminished.

Additionally, the mobile score GUI 710 of FIG. 7B can include EP progress scores for one or more users. As used herein, the term "EP progress score" refers to a score indicating how an individual user's EP score has progressed in a call. In particular, the emotive recognition and feedback system 104 calculates the progress EP score by subtracting an individual's EPS for the previous analyzed video chat segment from the individual's EPS for the last analyzed video segment. For example, a positive EP progress score indicates that the user's emotional state has improved since the last analyzed video chat segment. In practice, referencing the EP progress score enables a support agent to monitor the changes within a customer's emotional state.

FIG. 8 illustrates support dashboard GUI 800. Support dashboard GUI 800 enables support agents to view and manage active calls. As illustrated in FIG. 8, the support dashboard GUI 800 includes video chat information for a call involving one support agent and multiple customers in a video conferencing environment. As illustrated, support dashboard GUI 800 includes call information chart 802 and active video session element 804. Active video session element 804 includes emotive positivity information elements for a first customer 806a, second customer 806b, and third customer 806c.

The call information chart 802 of the support dashboard GUI 800 allows a support agent to visualize the number of video calls per day. In at least one embodiment, the support agent can interact with the call information chart 802 to modify the displayed information. For example, the support agent may select the selectable "Number of video calls" element and choose to view hours of video calls or other data regarding video calls. In at least one other embodiment, the call information chart 802 can illustrate other video chat session data. In particular, the call information chart 802 can include information such as average EIPS for calls within a certain time period, average EPS for customers, and average EPS for the support agent. Additionally, the support agent can select the time period element (e.g., "Day") to modify the time period from which the displayed information is selected. For example, the support agent can elect to view the number of video calls by year, month, day, hour, etc.

In the active video session element 804 of the support dashboard GUI 800, the emotive recognition and feedback system 104 presents emotive positivity information for the active video sessions. In particular, the active video session element 804 includes first customer emotive positivity information 806a, second customer emotive positivity information 806b, and third customer emotive positivity information 806c (collectively "customer emotive positivity information 806"). As illustrated, customer emotive positivity information 806 displays support information including the support agent's EPS, customer information including the customer's EPS, and an indicator of the EIPS. The indicator of the EIPS can include, as illustrated in FIG. 8, a visual representation of the EIPS. For example, the "Positivity" element of the customer emotive positivity information 806 can include a bar that indicates that the EIPS is neutral (e.g., as in customer emotive positivity information 806a), generally positive (e.g., as in customer emotive positivity information 806b), or generally negative (e.g., as in customer emotive positivity information 806c). In other embodiments, the Positivity element of the customer emotive positivity information 806 includes a numerical representation of the EIPS for each of the active callers. Though FIG. 8 illustrates the support dashboard GUI 800 for a support agent in active video chat sessions with three other users, the support dashboard GUI 800 can include information for more ore fewer other users.

In at least one other embodiment, the active video session element 804 can instead include summarized information regarding completed video chat sessions for a specified period of time. For example, the support agent can select to view information for video chat sessions for a specified day, week, month, year, etc. The completed video chat session information can include session average EIPS, user average EPS, and also an emotional score. As used herein, the term "emotional score" refers to a score indicating the effectiveness of a participant in a video chat session. In particular, the emotional score refers to the effectiveness of a support agent in improving the customer's emotional state and/or the interactivity positivity throughout the video chat session. The term "emotional score" can be further specified to refer to an EIPS emotional score and/or an EPS emotional score. The EIPS emotional score is calculated by subtracting the starting EIPS for the first analyzed video segment from the end EIPS for the last analyzed video segment. For example, an emotional score of +5.1 indicates that the support agent was effective at meeting the customer at the level they entered the call and guiding them to an improved state of satisfaction. The emotional score of +5.1 might indicate that the EIPS for the last analyzed video chat segment was 6 while the EIPS for the first analyzed video chat segment was 0.9 (e.g., 5.1 [emotional score]=6 [end EIPS]−0.9 [beginning EIPS]). In other words, a positive EIPS emotional score indicates that the emotional interactivity positivity score has improved over the course of the video chat communication session.

In at least one embodiment, the emotive recognition and feedback system 104 calculates the EPS emotional score by subtracting the customer's starting EPS for the first analyzed video segment from the end EPS for the last analyzed video segment. The EPS emotional score identifies the difference between an individual user's beginning and ending emotional state. In particular, the EPS emotional score indicates how a customer's emotional state has changed throughout a video chat session. In at least one embodiment, the EPS emotional score can also take into account the customer's engagement. For example, the starting score can comprise the EPS and engagement (e.g., starting score=Customer (EPS+Engagement)).

Figure 9:
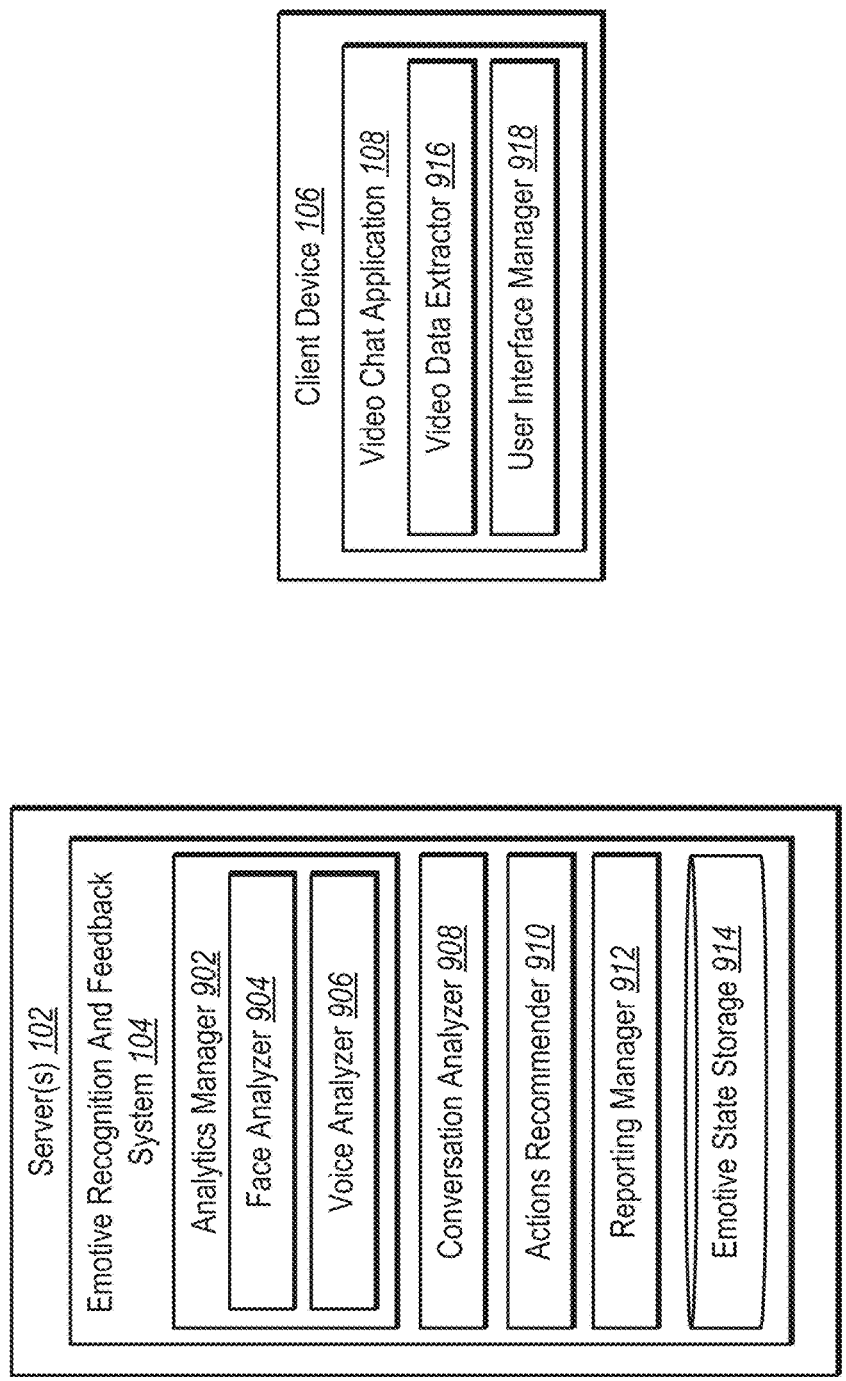
FIG. 9 illustrates a schematic diagram of components of an example emotive recognition and feedback system in accordance with one or more implementations of the present invention.

FIG. 9 illustrates a schematic diagram of an embodiment of the emotive response server(s) 102 and client device 106. In particular, FIG. 9 illustrates an embodiment of the emotive recognition and feedback system 104 located on server(s) 102. Additionally, FIG. 9 illustrates an embodiment of the video chat application 108 located on client device 106. Each will be discussed in turn below.

FIG. 9 illustrates a schematic diagram of an embodiment of the emotive recognition and feedback system 104. As shown, the emotive recognition and feedback system 104 can be implemented at least in part by the server(s) 102 and form part of a distributed architecture 900. Additionally, the emotive recognition and feedback system 104 can include, but is not limited to an analytics manager 802, a conversation analyzer 808, an actions recommender 810, a reporting manager 812, and an emotive state storage 814. The analytics manager 902 includes a face analyzer 904 and a voice analyzer 906. The emotive recognition and feedback system 104 can be implemented on any number of computing devices (e.g., the server(s) 102 and/or the client devices 106). For example, the emotive recognition and feedback system 104 can be implemented as part of the server(s) 102 in a distributed system of server devices for analyzing emotive states and identifying recommendations. Alternatively, the emotive recognition and feedback system 104 can be implemented on a single computing device such as the client device 106.

In one or more embodiments, each of the components of the emotive recognition and feedback system 104 are in communication with one another using any suitable communication technologies. Additionally, the components of the emotive recognition and feedback system 104 can be in communication with one or more devices including the client device 106. It will be recognized that although the components of the emotive recognition and feedback system 104 are shown to be separate in FIG. 9, any of the subcomponents may be combined into fewer components, such as into a single component, or divided into more components as may serve a particular implementation. Furthermore, although the components of FIG. 9 are described in connection with the emotive recognition and feedback system 104, at least some of the components for performing operations in conjunction with the emotive recognition and feedback system 104 described herein may be implemented on other devices within the environment.

The components of the emotive recognition and feedback system 104 can include software, hardware, or both. For example, the components of the emotive recognition and feedback system 104 can include one or more instructions stored on a computer-readable storage medium and executable by processors of one or more computing devices (e.g., the client device 106). When executed by the one or more processors, the computer-executable instructions of the emotive recognition and feedback system 104 can cause the computing devices to perform the emotive response methods described herein. Alternatively, the components of the emotive recognition and feedback system 104 can comprise hardware, such as a special purpose processing device to perform a certain function or group of functions. Additionally, or alternatively, the components of the emotive recognition and feedback system 104 can include a combination of computer-executable instructions and hardware.

As shown in FIG. 9, the emotive recognition and feedback system 104 can include an analytics manager 902. In one or more embodiments, the analytics manager 902 provides the emotional analysis of the customer throughout the duration of the call allowing the representative to see the effectiveness of the support in real time. The analytics manager 902 identifies video chat segments and analyzes the video chat segments to determine the emotional state of individual users. For example, the analytics manager 902 analyzes raw video data from each individual client device to determine an EPS for each individual user. In one embodiment, the analytics manager 902 resides on the server(s) 102. In at least one other embodiment, the analytics manager 902 resides on the client device 106.

When the analytics manager 902 illustrated in FIG. 9 receives raw video data for video chat segments, the analytics manager uses face analyzer 904 and/or voice analyzer 906 to determine the emotional states of individual participants within a video chat session. In particular, the face analyzer 904 detects facial landmarks, extracts face texture features, classifies facial actions, and models emotion expressions. In particular, the face analyzer 904 can identify an emotional state based on a combination of facial actions. For example, the face analyzer 904 can use facial coding technology to measure facial expressions of emotion in real time using algorithms to identify key landmarks on the face and analyze pixels in those regions to classify facial expressions. In one or more embodiments, the face analyzer 904 measures seven emotion metrics using facial coding technology: joy, surprise, neutral, sadness, disgust, anger, and fear.

The voice analyzer 906 illustrated in FIG. 9 analyzes vocal expressions to identify an emotional state. For example, the voice analyzer 906 can use vocal coding to observe changes in speech paralinguistics such as tone, loudness, tempo, and voice quality to distinguish emotions. In one or more embodiments, the voice analyzer 906 measures the same seven emotion metrics discussed above: joy, surprise, neutral, sadness, disgust, anger, and fear.

Additionally, as illustrated in FIG. 9, the emotive recognition and feedback system 104 can include the conversation analyzer 908. The conversation analyzer 908 evaluates the interactions between the emotional states of the individual users. The conversation analyzer 908 receives data from the analytics manager 902, including the individual EPS for each participating user, and calculates an EIP score for the video chat conversation. In particular, the conversation analyzer 908 utilizes the emotive interactivity matrix described with relation to FIG. 4C to calculate the EIP score. The conversation analyzer 908 can calculate EIP scores for each video chat segment identified by the analytics manager 902. Additionally, the conversation analyzer 908 can calculate an average EIP score for the entire video chat conversation. The conversation analyzer 908 also calculates a number of metrics based on the EIPS and the EPS that can be displayed to the support agent. In particular, the conversation analyzer 908 can calculate the EIPS progress score, the EPS progress score, the EIPS emotional score, and the EPS emotional score.

The actions recommender 910 illustrated in FIG. 9 is also a part of the emotive recognition and feedback system 104. The actions recommender 910 identifies advice and recommendations for users based on the emotive response matrix. For example, the actions recommender 910 matches the current emotional state of an agent against the current emotional state of a customer. In at least one embodiment, the actions recommender 910 can also match the emotional states of more than two users to identify a suggestion or recommendation for the user. In addition to providing real-time suggestions and recommendations through a video chat session, actions recommender 910 can also provide training videos at the end of the video chat session based on the interacting emotional states of the users. Thus, the actions recommender 910 can provide suggestions and recommendations for the purpose of improving current video chat sessions and also future emotional interactions with customers.

The reporting manager 912 of FIG. 9 provides, for display at the client device 106, real time information useful to the support agent. In particular, the reporting manager 912 can provide the percentage of the dominant emotion displayed by the support agent and the customer in real time, the current EIP score, and the change in EIP score from the client through the duration of the call.

The reporting manager 912 also can provide an administrator with emotional scoring information for each individual session by a support agent within a given time period. In at least one embodiment, the reporting manager 912 organizes the information to allow administrators see associated emotional scoring ratings in reports for the company, teams, and individuals. As used herein, the term "administrator" refers to any user that may access reports for support agents. In particular, the reporting manager 912 can compile administrator reports that include improvement over time for the aforementioned company, teams, and individuals, and begin to track new teams and individuals as they are created. The reporting manager 912 can allow an administrator to utilize drill downs in the reporting section to drill down and compare scores over time to see improvement. In particular, the reporting manager 912 can provide an administrator the following emotional scoring and drill downs:

Future: EIPS as it relates to overall Ratings
Future: EIPS as it relates to time of day/day of the week/week in the month/month
Future: EIPS as it relates to sales opportunities
Future: EIPS as it relates to new revenue
Future: EIPS as it relates to Support Agent Effectiveness
Future: EIPS as it relates to Call Duration
Future: EIPS as it relates to closed sales
Future: EIPS as it relates to customer call resolution
Future: EIPS as it relates to overall engagement and attentiveness, etc.

In one or more embodiments, the emotive recognition and feedback system 104 overcomes HTTP limitations on push notifications by using a WebSocket protocol and a node.js server. The emotive recognition and feedback system combines standard HTTP web pages with asynchronous JSONP calls for pull requests. It allows multiple site integration methods as an iFrame or as a Javascript component included as a script tag.

The emotive recognition and feedback system 104 includes utilities that automatically write customized code that will be used for specific client integrations. The automatically generated code includes PHP code, as well as triggers and stored procedures for multiple types of databases. This allows more efficient professional services during while implementing each customer's customizations. The database layer integrates with MySQL, Microsoft SQL Server and Oracle. The database layer automatically handles transactions and error handling. This gives clients the option of technology platforms.

Each of the components of the emotive recognition and feedback system 104 can include software, hardware, or both. For example, the components can include one or more instructions stored on a computer-readable storage medium and executable by processors of one or more computing devices, such as a client device or server device. When executed by the one or more processors, the computer-executable instructions of the emotive recognition and feedback system 104 can cause the computing device(s) to perform the methods/acts described herein. Alternatively, the components can include hardware, such as a special-purpose processing device to perform a certain function or group of functions. Alternatively, the components of the emotive recognition and feedback system 104 can include a combination of computer-executable instructions and hardware.

Furthermore, the components of the emotive recognition and feedback system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the emotive recognition and feedback system 104 may be implemented as a stand-alone application, such as a desktop or mobile application. Furthermore, the components of the emotive recognition and feedback system 104 may be implemented as one or more web-based applications hosted on a remote server. The components of the emotive recognition and feedback system 104 may also be implemented in a suite of mobile device applications (or "apps").

The emotive state storage 914 illustrated in FIG. 9 stores emotive data from video chat segments. In particular, the emotive state storage 914 retains emotive data from segments of video chat sessions instead of entire video chat sessions. The emotive state storage 914 stores data that enables the emotive recognition and feedback system 104 to continually improve recommendations. For example, the emotive state storage 914 can store emotive state data as well as the recommendations presented to the support agent for a particular video chat session. The emotive recognition and feedback system 104 can retrieve the recommendations and the emotive state data to improve the efficiency of suggestions and recommendations.

Turning now to client device 106 of FIG. 9. Video chat application 108 on client device 106 can include video data extractor 916 and user interface manager 918. The video chat application 108 can communicate with the emotive recognition and feedback system 104. The emotive recognition and feedback system 104 can provide the video chat application 108 in-session support actions, in-session support analytics, and/or administrative active call reporting.

In some embodiments, the video data extractor 916 of video chat application 108 analyzes raw video data for video chat segments, generates emotive data based on the raw video data, and sends the emotive data to the emotive recognition and feedback system 104. Thus, each individual client device 106 shares the processing power burden to generate emotive data to send to the emotive recognition and feedback system 104 instead of the emotive recognition and feedback system 104 conducting a centralized analysis. Furthermore, the video data extractor 916 can extract emotive data from video segments rather than from then entire video.

The user interface manager 918 can generate, create, and provide for display one or more graphical interfaces. For example, the interface manager 918 can generate a user interface that comprises a video chat interface, EP scores, EIP scores, emotive suggestions and recommendations, and other information that improves the efficiency of a video chat session.

Figure 10:
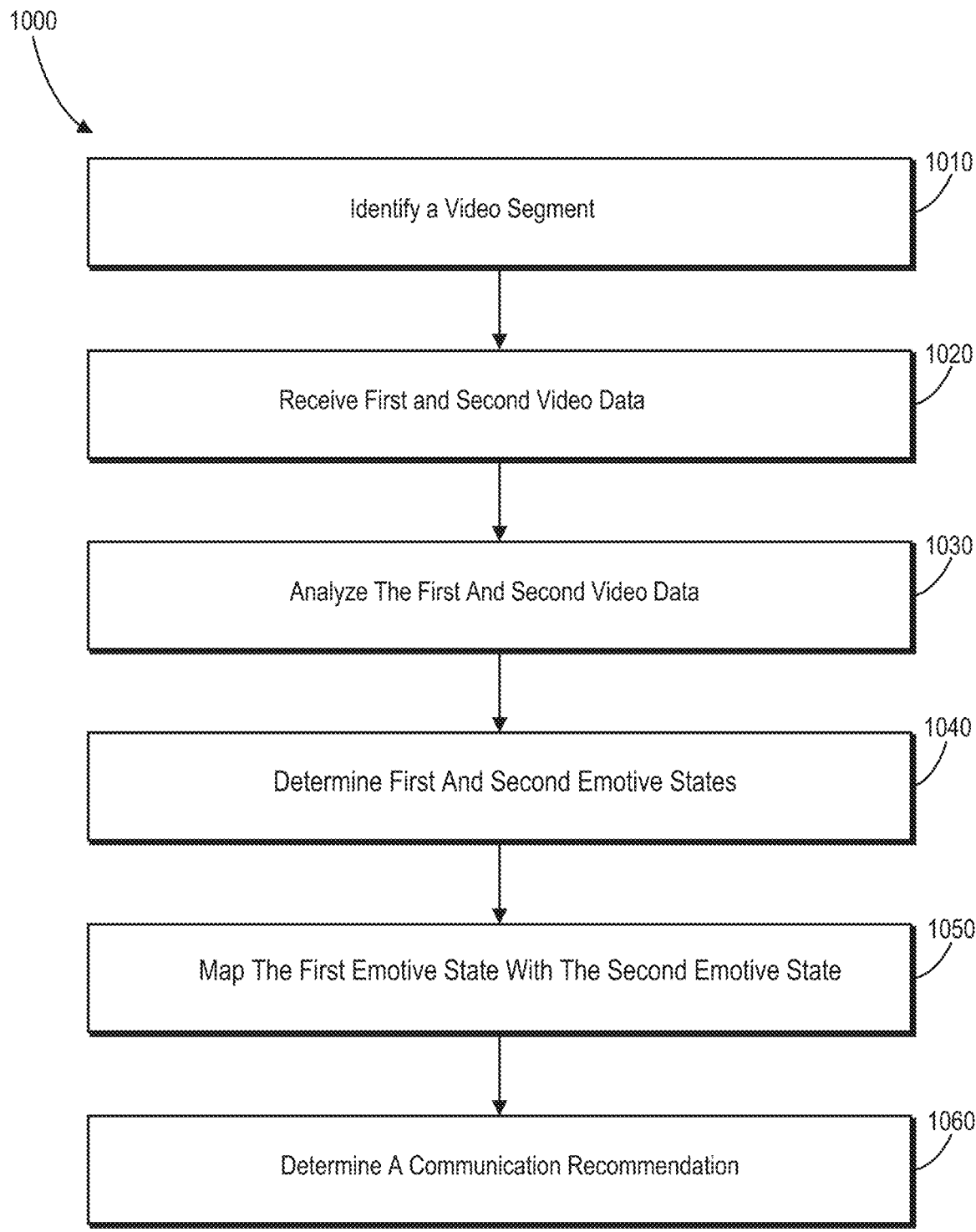
FIG. 10 illustrates an example flowchart of a series of acts for determining a communication recommendation in accordance with one or more embodiments disclosed herein.

FIGS. 1-9, the corresponding text, and examples provide a number of different systems and devices for monitoring and analyzing video chat sessions to provide communication recommendations. In addition to the foregoing, embodiments can also be described in terms of flowcharts comprising acts and steps in a method for accomplishing a particular result. Turning now to FIG. 10, a flowchart of a series of acts 1000 of providing a communication recommendation in accordance with one or more embodiments described herein is provided. While FIG. 10 illustrates acts according to one embodiment, alternative embodiments may omit, add to, reorder, and/or modify any of the acts shown in FIG. 10. The acts of FIG. 10 can be performed by a server as part of a method. Alternatively, a non-transitory computer-readable medium can comprise instructions, that when executed by one or more processors, cause a computing device to perform the acts of FIG. 10. In still further embodiments, a system can perform the acts of FIG. 10.

As shown in FIG. 10, the series of acts 1000 can include act 1010 of identifying a video segment. In particular, act 1010 includes identifying, by an emotive recognition and feedback system, a segment of a video. For example, the emotive recognition and feedback system 104 can identify a video chat segment of a real-time video chat communication session for which a user would like to receive communication recommendations.

In addition, the series of acts 1000 can include act 1020 of receiving first and second video data. In particular, act 1020 can include receiving, by the emotive recognition and feedback system, first video data associated with a first client device and second video data associated with a second client device, wherein the first video data and the second video data correspond to the segment of the video. For example, emotive recognition and feedback system 104 can receive raw data or emotive data points from the first and second client devices or a server of a third-party web service in communication with the first and second client devices. In one or more embodiments, the video comprises a video chat between the first user and the second user. In alternative embodiments, the video is a video of the first user and the second video data corresponds to a second video of the second user watching a delayed playing of the video.

The series of acts 1000 can include act 1030 of analyzing first and second video data. For example, as part of act 1030, the emotive recognition and feedback system performs facial and/or vocal coding to analyze the video data from the first and second video data. In one or more embodiments, act 1030 can involve identifying a first one or more facial expressions from the first video data and identifying a second one or more facial expression from the second video data.

The series of acts 1000 includes act 1040 of determining first and second emotive states. In particular, act 1040 includes based on analyzing the first video data and the second video data, determining a first emotive state associated with a first user in the video and a second emotive state associated with a second user relative to the video. For example, as part of act 1000, the emotive recognition and feedback system use the first and second video data to identify emotive states for the first and second users respectively. For example, determining the first emotive state associated with the first user of the first client device can involve determining a first emotion positivity score for the first user for the segment. Similarly, determining the second emotive state associated with the second user of the second client device can involve determining a second emotion positivity score for the second user for the segment. Act 1040 can involve mapping the first one or more facial expressions to the first emotive state and mapping the second one or more facial expressions to the second emotive state.

The series of acts 1000 also includes act 1050 of mapping the first and second emotive states. In particular, act 1050 includes mapping the first emotive state with the second emotive state. For example, the emotive response system can use the emotive response matrix illustrated in FIG. 5. The emotive response system can place the emotive state of the first user on one axis and the emotive state for the second user on another axis as illustrated in FIG. 5. Mapping the first and second emotive states can involve generating the communication effectiveness score for the segment of the video chat communication session by combining the first emotion positivity score and the second emotion positivity score. For example, act 1050 can involve combining the first emotion positivity score and the second emotion positivity score using a coded emotive interactivity matrix.

The series of acts 1000 includes step 1060 of determining a communication recommendation. In particular, step 1060 includes based on mapping the first emotive state with the second emotive state, determining a communication recommendation for the segment of the video chat communication session. In particular, determining the communication recommendation for the segment of the video chat communication session based on the mapping the first emotive state with the second emotive state can involve using a dynamic emotive response matrix to identify the communication recommendation based on an intersection of the first emotive state and the second emotive state in the dynamic emotive response matrix. In one or more embodiment, act 1060 can involve identifying one or more of a positive reinforcement, an encouragement, or an action from an intersection of the first emotive state and the second emotive state in a matrix. For example, the emotive recognition and feedback system 104 can use the emotive response matrix of FIG. 5 to identify an intersection of the first user emotive state and the second user's emotive state to identify a prompt, recommendation, or real-time feedback to provide to one of the users.

The series of acts 1000 can include additional acts. In particular, the series of acts 1000 can include a step comprising providing, for display at the first client device, a graphical user interface including the communication recommendation. For example, the emotive recognition and feedback system 104 can present, for display at the first user's client device, the graphical user interfaces illustrated in FIG. 6 and FIG. 7A.

The series of acts 1000 can include an additional step comprising generating a communication effectiveness score for the segment based on mapping the first emotive state with the second emotive state. For example, the emotive recognition and feedback system 104 can use the emotive interactive matrix illustrated in FIG. 4C to generate a communication effectiveness score (e.g., Emotional Interactive Positivity score).

The series of acts 1000 can include an additional step comprising providing, for display at the first client device, an effectiveness score graphical user interface including the communication effectiveness score. For example, and as illustrated in FIGS. 6 and 7B, the emotive recognition and feedback system can present, for display, the EIPS for the video chat communication session.

The series of acts 1000 can also include an additional step comprising identifying a subsequent segment of the video chat communication session between the first client device and the second client device; receiving, by the emotive recognition and feedback system, subsequent first video data associated with the first client device and subsequent second video data associated with the second client device, wherein the subsequent first video data and the subsequent second video data correspond to the subsequent segment of the video chat communication session; analyzing the subsequent first video data and the subsequent second video data; based on analyzing the subsequent first video data and the subsequent second video data, determining a subsequent first subsequent emotive state associated with the first user of the first client device and a second subsequent emotive state associated with the second user of the second client device for the subsequent segment; mapping the subsequent first emotive state with the subsequent second emotive state; and based on mapping the subsequent first emotive state with the subsequent second emotive state, determining a subsequent communication recommendation for the subsequent segment of the video chat communication session. For example, and as illustrated in FIG. 4B, the emotive recognition and feedback system 104 can identify and analyze video data for subsequent video chat segments. Additionally, method 1000 can also include a step comprising providing, for display at the first client device, an updated graphical user interface to include the subsequent communication recommendation.

The series of acts 1000 can also include a step comprising determining a third emotive state associated with a third user of a third client device involved in the video chat communication session.

Figure 11:
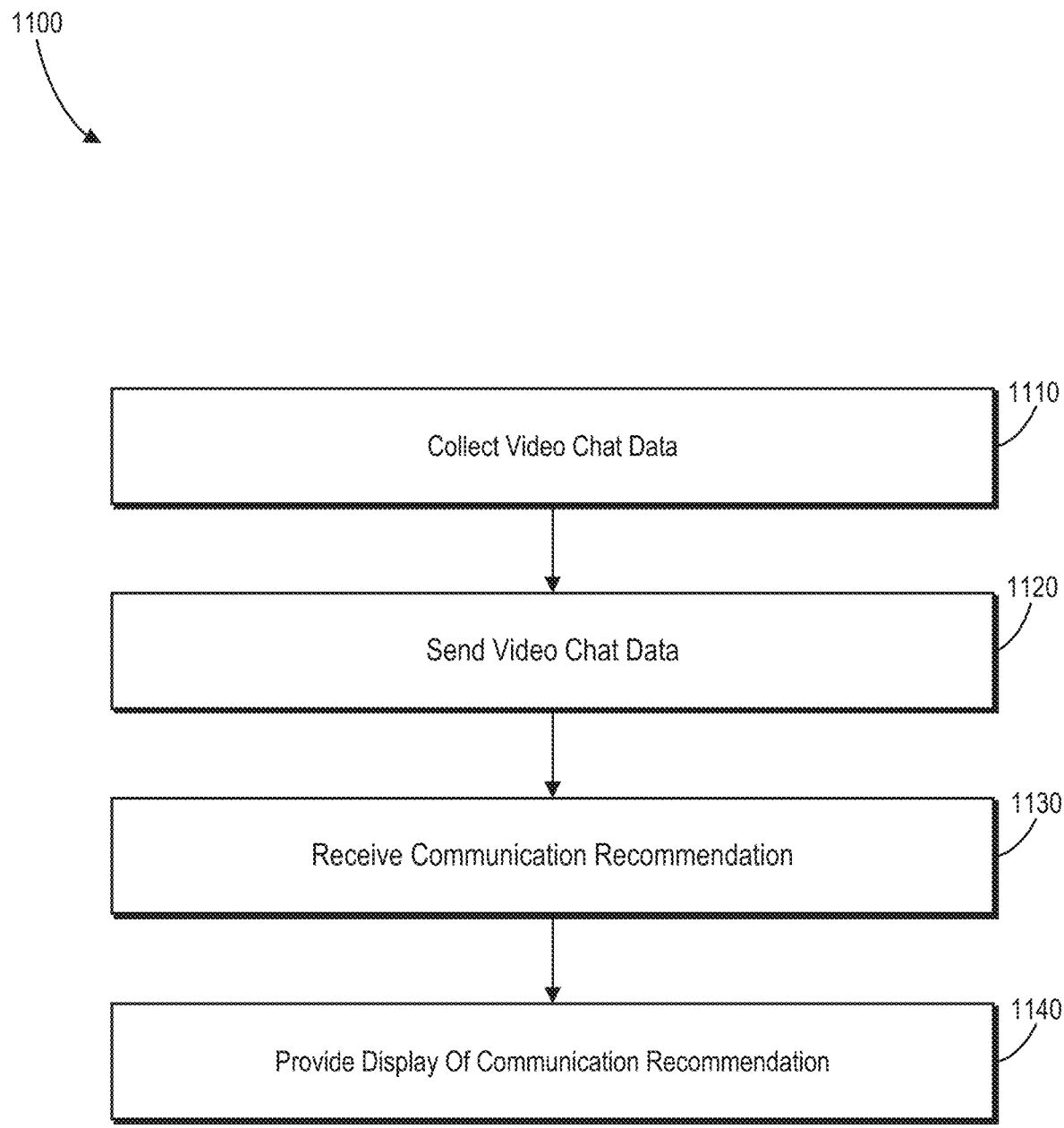
FIG. 11 illustrates an example flowchart of a series of acts for providing a display of the communication recommendation in accordance with one or more embodiments herein.

FIG. 11 illustrates a flowchart of a series of acts 1100 performed by a client device to provide, to a user, a communication recommendation for a video chat session in accordance with one or more embodiments described herein. While FIG. 11 illustrates acts according to one embodiment, alternative embodiments may omit, add to, reorder, and/or modify any of the acts shown in FIG. 11. A non-transitory computer-readable medium can comprise instructions, that when executed by one or more processors, cause a computing device to perform the acts of FIG. 11.

As shown in FIG. 11, the series of acts 1100 can include act 1110 of collecting video data. In particular, act 1110 can include collecting, by a first client device, video data associated with the first client device, wherein the first client device is involved in a communication session with a second client device. For example, act 1120 can involve collecting a video segment or one or more screen shots of the communication session at predetermined intervals.

As shown in FIG. 11, the series of acts 1100 can include act 1120 of sending video data. In particular, act 1120 can include sending, by the first client device, the video data associated with the first client device to an emotive response server.

As shown in FIG. 11, the series of acts 1100 can include act 1130 of receiving a communication recommendation. In particular, act 1130 can include receiving, from the emotive response server, a graphical user interface including a communication recommendation, wherein the communication recommendation is based on a first emotive state of a user of the first client device and a second emotive state of a user of the second client device.

As shown in FIG. 11, the series of acts 1100 can include act 1140 of providing a display of the communication recommendation. In particular, act 1140 can include based on mapping the first emotive state with the second emotive state, determine a communication recommendation for the segment of the video chat communication session.

The series of acts 1100 can also include an additional act comprising providing, for display at the first client device, a graphical user interface including the communication recommendation. For example, the series of acts 1100 can involve providing the display of the communication recommendation at the first client device in a user interface with a display of a video of the communication session.

Additionally, the series of acts 1100 can include an act comprising generating a communication effectiveness score for the segment based on mapping the emotive state with the second emotive state. The series of acts 1100 can include an act comprising displaying at the first client device, an effectiveness score graphical user interface including the communication effectiveness score. The series of acts 1100 can also include an act comprising providing, for display at the first client device, an updated graphical user interface to include the subsequent communication recommendation. Optionally, the series of acts can involve displaying an emotional call journey that maps emotive states of the first user and the second user over time during the communication session.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
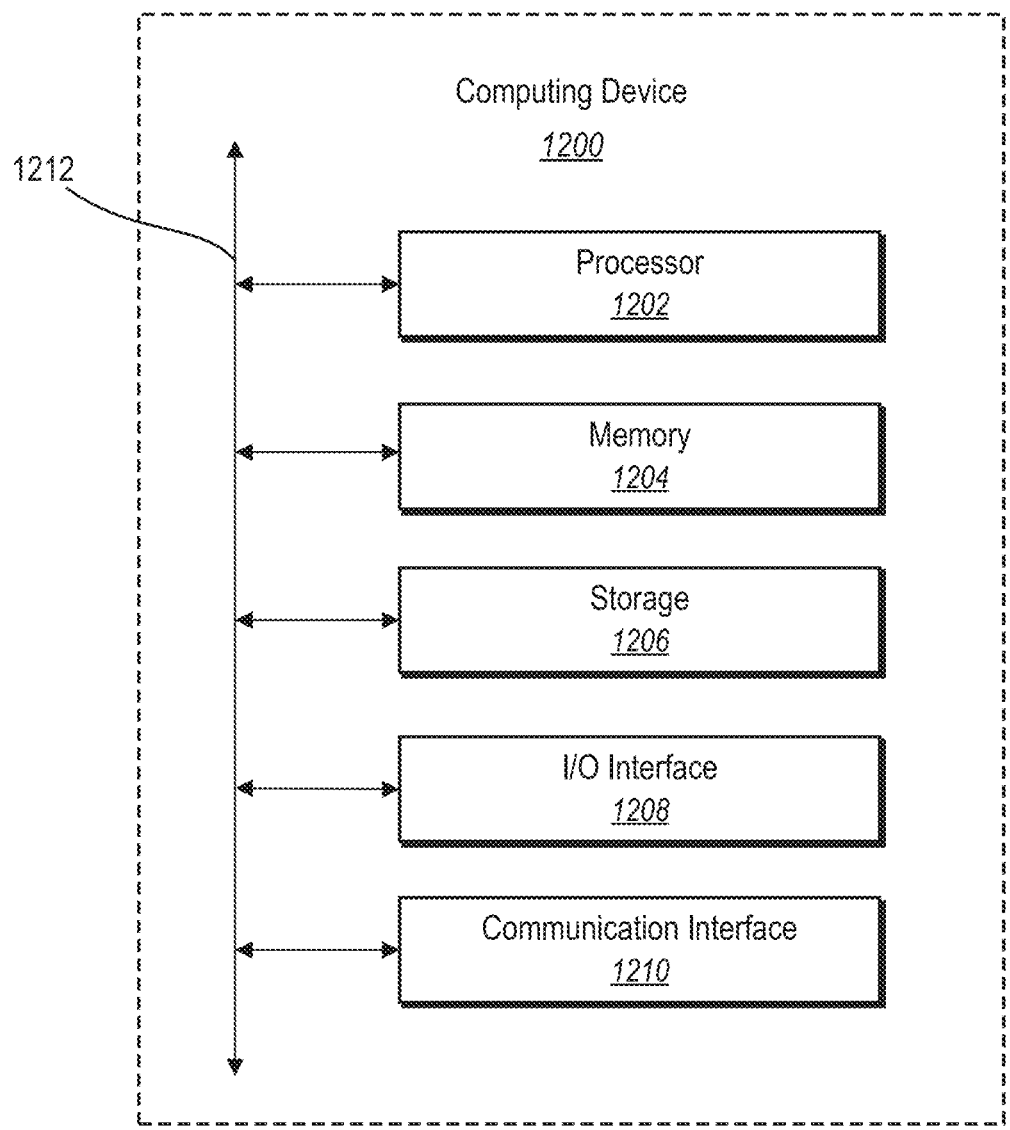
FIG. 12 illustrates an exemplary computing system in accordance with one or more implementations of the present invention.

FIG. 12 illustrates a block diagram of an example computing device 1200 that may be configured to perform one or more of the processes described above. One will appreciate that one or more computing devices, such as the computing device 1200 may represent the computing devices described above (e.g., client device 104 and server(s) 102). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

One or more embodiments of the present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
identifying, by an emotive recognition and feedback system, a segment of a video;
receiving, by the emotive recognition and feedback system, first video data associated with a first client device operated by a first user and second video data associated with a second client device operated by a second user, wherein the first video data and the second video data correspond to the segment of the video;
analyzing the first video data and the second video data;
based on analyzing the first video data and the second video data, generating a first emotional positivity score corresponding to a first emotive state associated with the first user in the video and a second emotional positivity score corresponding to a second emotive state associated with the second user relative to the video;
generating an interactive positivity score based on mapping the first emotional positivity score with the second emotional positivity score by utilizing a coded emotive interactivity matrix;
and determining a communication recommendation for the segment of the video based on the interactive positivity score.

2. The method as recited in claim 1, wherein:
the video comprises a video chat between the first user and the second user; and
the communication recommendation is provided during the video chat.

3. The method as recited in claim 1, wherein the second video data corresponds to a second video of the second user watching a delayed playing of the video.

4. The method as recited in claim 1, further comprising displaying an emotional call journey that maps emotive states of the first user and the second user over time.

5. The method as recited in claim 1, further comprising receiving the first video data and the second video data by receiving one or more screen shots from the first client device and the second client device at predetermined intervals.

6. The method as recited in claim 1, further comprising determining the communication recommendation for the segment of the video based on the mapping the interactive positivity by using a dynamic emotive response matrix to identify the communication recommendation based on an intersection of the first emotive state and the second emotive state in the dynamic emotive response matrix.

7. The method as recited in claim 1, further comprising providing, for display at the first client device, an effectiveness score graphical user interface including the interactive positivity score.

8. The method as recited in claim 7, further comprising:
identifying a subsequent segment of the video;
receiving, by the emotive recognition and feedback system, subsequent first video data associated with the first client device and subsequent second video data associated with the second client device, wherein the subsequent first video data and the subsequent second video data correspond to the subsequent segment of the video;
analyzing the subsequent first video data and the subsequent second video data;
based on analyzing the subsequent first video data and the subsequent second video data, generating a first subsequent emotional positivity score corresponding to a first subsequent emotive state associated with the first user and a second subsequent emotional positivity score corresponding to a second subsequent emotive state associated with the second user for the subsequent segment;
generating a subsequent interactive positivity score based on mapping the first subsequent emotional positivity score with the second subsequent emotional positivity score; and
based on mapping the subsequent first emotive state with the subsequent second emotive state, determining a subsequent communication recommendation for the subsequent segment of the video.

9. The method as recited in claim 8, further comprising generating an emotional call journey that maps emotive states of the first user and the second user over time by:
plotting the first emotional positivity score corresponding to the segment and the first subsequent emotional positivity score corresponding to the subsequent segment; and
plotting the second emotional positivity score corresponding to the segment and the second subsequent emotional positivity score corresponding to the subsequent segment.

10. The method as recited in claim 9, further comprising providing, for display at the first client device, the emotional call journey that maps the emotive states of the first user and the second user over time.

11. A system comprising:
at least one processor; and
at least one non-transitory computer-readable storage medium storing instructions there on that, when executed by the at least one processor, cause the system to:
identify a segment of a video;
receive first video data associated with a first client device operated by a first user and second video data associated with a second client device operated by a second user, wherein the first video data and the second video data correspond to the segment of the video;
analyze the first video data and the second video data;
based on analyzing the first video data and the second video data, generate a first emotional positivity score corresponding to a first emotive state associated with the first user in the video and a second emotional positivity score corresponding to a second emotive state associated with the second user relative to the video;
generate an interactive positivity score based on mapping the first emotional positivity score with the second emotional positivity score by utilizing a coded emotive interactivity matrix; and
determine a communication recommendation for the segment of the video based on the interactive positivity score.

12. The system of claim 11, wherein the instructions, when executed by the at least one processor, cause the system to determine the communication recommendation for the segment of the video based on mapping the first emotive state with the second emotive state by identifying one or more of a positive reinforcement, an encouragement, or an action from an intersection of the first emotive state and the second emotive state in a matrix.

13. The system of claim 11, wherein instructions, when executed by the at least one processor, cause the system to analyze the first video data and the second video data by identifying a first one or more facial expressions from the first video data and identifying a second one or more facial expressions from the second video data.

14. The system of claim 13, wherein the instructions, when executed by the at least one processor, cause the system to determine the first emotive state associated with the first user of the first client device and the second emotive state associated with the second user of the second client device by mapping the first one or more facial expressions to the first emotive state and mapping the second one or more facial expressions to the second emotive state.

15. A non-transitory computer readable medium comprising instructions that, when executed by at least one processor, cause a computing device to:
- identify, by an emotive recognition and feedback system, a segment of a video;
- receive, by the emotive recognition and feedback system, first video data associated with a first client device operated by a first user and second video data associated with a second client device operated by a second user, wherein the first video data and the second video data correspond to the segment of the video;
- analyze the first video data and the second video data;
- based on analyzing the first video data and the second video data, generate a first emotional positivity score corresponding to a first emotive state associated with the first user in the video and a second emotional positivity score corresponding to a second emotive state associated with the second user relative to the video;
- generate an interactive positivity score based on mapping the first emotional positivity score with the second emotional positivity score by utilizing a coded emotive interactivity matrix; and
- determine a communication recommendation for the segment of the video based on the interactive positivity score.

16. The non-transitory computer readable medium as recited in claim 15, further comprising instructions to, when executed by the at least one processor, cause the computing device to provide, for display at the first client device, an emotional call journey that maps emotive states of the first user and the second user over time.

17. The non-transitory computer readable medium as recited in claim 15,
wherein the second video data corresponds to a second video of the second user watching a delayed playing of the video.

18. The non-transitory computer readable medium as recited in claim 15, wherein: the video comprises a video chat between the first user and the second user; and
the communication recommendation is provided during the video chat.

19. The non-transitory computer readable medium as recited in claim 15,
wherein the instructions, when executed by the at least one processor, cause the computing device to receive the first video data and the second video data by receiving one or more screen shots from the first client device and the second client device at predetermined intervals.

20. The non-transitory computer readable medium as recited in claim 15, wherein the first client device comprises a mobile device.

* * * * *